United States Patent
Teramae et al.

(10) Patent No.: US 7,785,679 B2
(45) Date of Patent: Aug. 31, 2010

(54) SUPPORT FOR IMAGE RECORDING MATERIAL AND IMAGE RECORDING MATERIAL

(75) Inventors: Shinichi Teramae, Fujinomiya (JP); Hiroshi Yamamoto, Fujinomiya (JP)

(73) Assignee: FUJIFILM Corporation, Tokyo (JP)

( * ) Notice: Subject to any disclaimer, the term of this patent is extended or adjusted under 35 U.S.C. 154(b) by 452 days.

(21) Appl. No.: 11/815,477

(22) PCT Filed: Feb. 3, 2006

(86) PCT No.: PCT/JP2006/302302

§ 371 (c)(1), (2), (4) Date: Aug. 3, 2007

(87) PCT Pub. No.: WO2006/083032

PCT Pub. Date: Aug. 10, 2006

(65) Prior Publication Data

US 2009/0202753 A1    Aug. 13, 2009

(30) Foreign Application Priority Data

Feb. 4, 2005    (JP) .............................. 2005-029755

(51) Int. Cl.
*B41M 5/00*    (2006.01)

(52) U.S. Cl. ................. 428/32.18; 428/32.2; 428/32.21; 428/32.26; 428/32.27; 428/32.28; 428/32.3; 428/32.31; 428/32.34

(58) Field of Classification Search ............. 428/32.18, 428/32.2, 32.21, 32.26, 32.27, 32.28, 32.3, 428/32.31, 32.34
See application file for complete search history.

(56) References Cited

U.S. PATENT DOCUMENTS

| | | | |
|---|---|---|---|
| 6,277,498 B1 * | 8/2001 | Endo et al. .................. 428/500 |
| 2004/0185193 A1 * | 9/2004 | Taka et al. ............... 428/32.18 |

FOREIGN PATENT DOCUMENTS

| | | | |
|---|---|---|---|
| JP | 2001-63204 A | 3/2001 |
| JP | 2001-115396 A | 4/2001 |
| JP | 2001-301098 A | 10/2001 |
| JP | 2004-149952 A | 5/2004 |

\* cited by examiner

*Primary Examiner*—Betelhem Shewareged
(74) *Attorney, Agent, or Firm*—Sughrue Mion, PLLC

(57) ABSTRACT

A support for an image recording material for receiving at least an image recording layer. The center surface average roughness SRa of the support surface to be provided with an image recording layer is 0.15 μm or less when measured under a condition of a cutoff of 0.02 to 0.5 mm, and is 0.45 μm or less when measured under a condition of a cutoff of 1 to 3 mm. An image recording material having an image recording layer on the support. The center surface average roughness SRa of the surface of the image recording material which surface is to be provided with an image is 0.1 μm or less when measured under a condition of a cutoff of 0.02 to 0.5 mm.

11 Claims, No Drawings

SUPPORT FOR IMAGE RECORDING MATERIAL AND IMAGE RECORDING MATERIAL

TECHNICAL FIELD

The present invention relates to image recording materials such as an electrophotographic image-receiving material, an inkjet recording material, a silver salt photographic material, a sublimation transfer image-receiving material, a thermally coloring recording material and a thermal transfer image-receiving material, and supports for the image recoding materials.

BACKGROUND ART

In recent years, development of various types of information processing systems have accompanied rapid advance of the information industry, and recording methods and apparatuses appropriate for the information processing systems have also been developed and put into practical use.

Practically-used recording methods are, in addition to silver salt photography, the electrophotographic method, the inkjet recording method, the thermal recording method, the sublimation transfer method, the thermal transfer method, and the like. In any of the methods, sharp high-quality images with vivid hue should be formed.

Among these recording methods, for example, the inkjet recording method has widely been used not only in offices but also at home because 1) the inkjet recording method can perform recording on various types of recording materials, and 2) recording by the inkjet recording method can be conducted by compact and relatively-inexpensive hardware (apparatuses) with less noise.

Further, various types of inkjet recording media have been developed along with the recent improvement of the resolution of the image obtained by using inkjet printers and along with the recent development of hardware (apparatuses) for inkjet recording in recent years; as a result, it has become possible to obtain a so-called photograph-like recorded matter having high image quality.

Characteristics required particularly for an inkjet recording medium are generally as follows: (1) quick drying property (high ink absorbing rate) of the medium; (2) an adequate and uniform diameter of ink dots (without bleeding); (3) favorable graininess; (4) high roundness of dots; (5) high color density; (6) high color saturation (without dullness); (7) superior light resistance, gas resistance, and water resistance of printed portions; (8) high whiteness of the recording face; (9) superior storage stability of the recording medium (without yellowing or bleeding in a long-term storage); (10) superior dimensional stability and resistance to deformation (that suppresses curling to a sufficiently small degree); (11) superior running property on hardware; and the like. Further, glossy photographic paper which is used for the purpose of obtaining a photograph-like high-quality recorded matter is required to have the above-described characteristics and, in addition, glossiness, surface smoothness, and photographic-paper-like appearance similar to silver salt photographs.

A resin-coated paper has conventionally been used as a support which constitutes an inkjet recording medium in order to achieve glossiness, smoothness, and high image quality. The resin-coated paper has a paper base both sides of which are laminated with a polyethylene resin. However, the resin-coated paper does not absorb the ink solvent in the applied ink; therefore, when the paper is put in a file immediately after printing and stored, a problem is created in that bleeding of the image occurs over the time owing to the remaining ink solvent that has not evaporated.

In order to prevent the image bleeding, a support having no resin coating may be used to make an inkjet recording medium. When an ink-receiving layer is provided directly on an absorptive support such as a commercially-available paper base, the bleeding over time is reduced by the absorption of the ink solvent; however, a problem is created, for example in that the surface glossiness is markedly deteriorated.

In Japanese Patent Application Laid-Open (JP-A) No. 2001-301098, a support for image recording is disclosed. The support has paper whose both sides are coated with a resin capable of forming a film. The degree of glossiness defined by JIS P8142 of the paper surface on the side to be provided with the image is 20% or more, and the center surface average roughness SRa of the surface on the side to be provided with the image is 0.75 μm or less when measured under the condition of a cutoff of 6 to 7 mm. Although the support is excellent in smoothness, there is room for improvement of the image clarity In addition, an inkjet recording sheet (member) having an ink-receiving layer is disclosed (refer to JP-A Nos. 9-174998 and 9-183268). The ink-receiving layer is composed of at least two layers. The lower layer is prepared by curing a layer containing a water-soluble electron-beam-curable resin, and the upper layer contains an adhesive and pigment particles having an average particle diameter of 1 μm or less. However, the surface roughness of this inkjet recording sheet (member) has not been examined, and it is not clear whether the glossiness of the inkjet recording sheet is good or bad.

Further, in JP-A No. 2001-63204, an inkjet recording medium having at least one ink-receiving layer containing a vapor-phase-method silica provided on a polyolefin-resin-coated paper support is disclosed. The support has a 75-degree specular glossiness of 30 to 70% and a center surface average roughness SRa of 0.11 to 0.50 (at wavelength: 0.8 mm). In this inkjet recording medium, problems of the ink absorbing property, glossiness and cracks have been solved to some extent, but has not been completely solved.

DISCLOSURE OF INVENTION

The present invention has been accomplished in consideration of the conventional techniques.

The invention provides a support for an image recording material. The center surface average roughness SRa of the support surface on the side to be provided with an image is 0.15 μm or less when measured under the condition of a cutoff of 0.02 to 0.5 mm and is 0.45 μm or less when measured under the condition of a cutoff of 1 to 3 mm.

The support may have one or more layers provided on a base, and at least one of the one or more layers is a layer containing an electron-beam-curable resin.

The support may have two or more layers provided on a base, and the layers may include two layers adjacent to each other in which the lower layer contains a thermoplastic resin and the upper layer contains an electron-beam-curable resin.

The support may have two or more layers provided on a base, and the layers may include two layers adjacent to each other in which the lower layer is a coated layer containing pigment particles and a water-soluble or water-dispersible resin and the upper layer contains a thermoplastic resin.

The support may have two or more layers provided on a base, and the layers may include two layers adjacent to each other in which the lower layer is a cast-coat layer and the upper layer contains a thermoplastic resin.

The support may have one or more layers on a side of the base, the side being the side to be provided with an image recording layer. The outermost layer of the one or more layers may contain a thermoplastic resin, and the thickness of the layer containing the thermoplastic resin may be 30 μm or more.

The invention also provides an image recording material having an image forming layer provided on any of the above-described supports for image recording materials. The center surface average roughness SRa of the surface on the side to be provided with an image is 0.1 μm or less when measured under the condition of a cutoff of 0.02 to 0.5 mm, and is 0.4 μm or less when measured under the condition of a cutoff of 1 to 3 mm.

The image recording material may be selected from the group consisting of an inkjet recording material, an electrophotographic image-receiving material, a silver salt photographic material, a sublimation transfer image-receiving material, a thermally coloring recording material and a thermal transfer image-receiving material.

The image forming layer may be an ink-receiving layer. The ink-receiving layer may contain inorganic particles. The inorganic particles may be selected from the group consisting of silica particles, colloidal silica, alumina particles, and pseudoboehmite. The inorganic particles may be selected from the group consisting of vapor-phase-method silica and pseudoboehmite.

According to the invention, a support for an image recording material which has excellent surface smoothness, and an image recording material with excellent image clarity and smoothness can be provided.

BEST MODE FOR CARRYING OUT THE INVENTION (Support for Image Recording Material)

In the support for image recording material according to the present invention, the center surface average roughness SRa of the surface on the side (image-recording side) to be provided with an image is 0.15 μm or less when measured under the condition of a cutoff of 0.02 to 0.5 mm, and is 0.45 μm or less when measured under the condition of a cutoff of 1 to 3 mm.

Since the support has a center surface average roughness SRa within the above-described ranges, the smoothness of the surface is excellent. Therefore, when an image recording layer such as an ink-receiving layer is formed thereon, the smoothness of the layer can be improved.

If the center surface average roughness SRa is over 0.15 μm when measured under the condition of a cutoff of 0.02 to 0.5 mm, the image clarity is deteriorated. On the other hand, if the center surface average roughness SRa is over 0.45 μm when measured under the condition of a cutoff of 1 to 3 mm, the smoothness is deteriorated.

The center surface average roughness SRa measured under the condition of a cutoff of 0.02 to 0.5 mm is preferably 0.13 μm or less and, more preferably, 0.01 to 0.1 μm. The center surface average roughness SRa measured under the condition of a cutoff of 1 to 3 mm is preferably 0.4 μm or less and, more preferably, 0.1 to 0.35 μm.

In the invention, the center surface average roughness SRa can be set within the above-described ranges, for example by the following measures:

(1) performing calendering treatment on the base paper;
(2) performing calendering treatment on the support;
(3) providing a coat layer and/or a thermoplastic resin layer;
(4) subjecting the coat layer to mirror finish (cast);
(5) increasing the thickness of each layer.

Hereinafter, specific embodiments ((a) to (e)) of preferred constitutions in which the center surface average roughness SRa of the support for image recording material is set within the above-described ranges are described; however, the invention is not limited to these embodiments.

Embodiment (a)

In this embodiment, the support has one or more layers on the image-recording side of the base, and at least one of the one or more layers contains an electron-beam-curable resin. Since the layer containing the electron-beam-curable resin is formed by pressure-bonding of a film followed by curing in this embodiment, the smoothness of the film is reflected in the finally-obtained surface; this embodiment is favorable in that respect. The base and the layer containing the electron-beam-curable resin are described below.

Base

The base may be a natural pulp paper containing a common natural pulp as the main component; a mixed paper containing a natural pulp and a synthetic fiber; a synthetic fiber paper containing a synthetic fiber as the main component; or a so-called synthetic paper produced from a synthetic resin film such as a film of polystyrene, polyethylene terephthalate, polypropylene, or the like. The base paper is particularly preferably natural pulp paper (hereinafter, referred to simply as "base paper"). The base paper may be neutral paper (pH: 5 to 9) or acidic paper, but is preferably neutral paper.

The base paper contains a natural pulp selected from softwoods, hardwoods, or the like as the main component, and additionally contains, as necessary, a filler such as clay, talc, calcium carbonate, or urea resin particles; a sizing agent such as rosin, alkylketene dimer, a higher fatty acid, an epoxidized fatty acid amide, paraffin wax, or alkenyl succinate; a paper-strength additive such as starch, polyamide polyamine epichlorohydrin, or polyacrylamide; a fixing agent such as aluminum sulfate or a cationic polymer; or the like. A softening agent such as a surfactant may also be added. A synthetic paper made from synthetic pulp instead of natural pulp may be used. As an alternative, a paper made from a mixture of natural and synthetic pulps in an arbitrary ratio may also be used. Among them, hardwood pulp shorter in fiber length is preferable as it provides paper with higher surface smoothness. The freeness of the pulp to be used is preferably in the range of 200 to 500 ml (C.S.F), and more preferably in the range of 300 to 400 ml.

The base may further contain other components such as a sizing agent, a softening agent, a paper strength additive, and a fixing agent. Examples of the sizing agent include rosin, paraffin wax, higher fatty acid salts, alkenyl succinate salts, fatty acid anhydrides, styrene-maleic anhydride copolymers, alkylketene dimers and epoxidized fatty acid amides. Examples of the softening agent include the product obtained by the reaction of a maleic anhydride copolymer and a polyalkylene polyamine, and a quaternary ammonium salt of a higher fatty acid. Examples of the paper strength additive include polyacrylamide, starch, polyvinyl alcohol, melamine-formaldehyde condensates, and gelatin. Examples of the fixing agent include aluminum sulfate and polyamide polyamine epichlorohydrin. Further, substances selected from dyes, fluorescence dyes, antistatic agents and the like may be added if necessary.

It is preferable to subject the base to an activating treatment, such as a corona discharge treatment, a flame treatment, a glow discharge treatment, or a plasma treatment before the formation of the support.

The thickness of the base is preferably 25 to 300 μm and, more preferably, 40 to 250 μm.

[Layer Containing Electron-beam-curable Resin]

The layer containing the electron-beam-curable resin contains an electron-beam-curable resin as a main component, and has been fixed by being irradiated with electron beams. The electron-beam-curable resin is preferably a water-soluble electron-beam-curable resin. Examples of water-soluble electron-beam-curable resins usable in the invention include the following (1) to (12); however, the invention is not limited thereto:

(1) butanediol mono(meth)acrylate, 2-ethoxyethyl (meth)acrylate, n-hexyl (meth)acrylate, 2-hydroxyethyl (meth)acrylate, hydroxypropyl (meth)acrylate, 2-methoxyethyl (meth)acrylate, polypropylene glycol mono(meth)acrylate and polyethylene glycol mono(meth)acrylate;

(2) butanediol di(meth)acrylate, neopentyl glycol di(meth)acrylate and polyethylene glycol di(meth)acrylate;

(3) t-butylaminoethyl (meth)acrylate, N,N-dimethylaminoethyl (meth)acrylate and N,N-diethylaminoethyl (meth)acrylate;

(4) tetrahydrofurfuryl (meth)acrylate, vinyl acetate, N-vinyl caprolactam and N-vinyl pyrrolidone;

(5) a natural or synthetic water-soluble polymer compound to which a radiation-reactive functional group represented by —O—CH(OH)—CH(OH)—NH—CO—CR=$CH_2$ (R representing a hydrogen atom or an alkyl group) as a side chain is introduced by the reaction of acrylamide or an acrylamide derivative and a (di)aldehyde such as glyoxal in the presence of a catalyst. Examples of the natural water-soluble polymer compound include casein, gelatin, starch-based polysaccharides (for example, dextrin, soluble starch, α-starch and pullulan) and derivatives thereof, and cellulose derivatives (for example, nitrocellulose, carboxymethyl cellulose (CMC), methyl cellulose (MC), hydroxypropylmethyl cellulose (HPMC), ethyl cellulose (EC), hydroxyethyl cellulose (HEC) and hydroxypropyl cellulose (HPC)). Examples of the synthetic water-soluble polymer compound include completely-saponified polyvinyl alcohol and partially-saponified polyvinyl alcohol;

(6) polyvinyl alcohol or the like having at least one functional group selected from the group consisting of a (meth)acryloyl group, a haloalkyl (meth)acyloyl group and N-methylol acrylamide;

(7) a monofunctional monomer or oligomer containing a carboxyl group whose typical examples are ethylenic unsaturated monocarboxylic acids, ethylenic unsaturated polycarboxylic acids, and the like (such as (meth)acrylic acid, and (meth)acrylic acid dimmer and (meth)acrylic acid trimer represented by $CH_2$=$CRCOO(CH_2CHRCOO)_nH$ (n≧1; R represents H or $CH_3$)), or a monofunctional monomer or oligomer containing a carboxylic acid base such as an alkaline metal salt, ammonium salt or amine salt of any of the above-described monofunctional monomers and oligomers;

(8) a monofunctional monomer or oligomer containing an amide group whose typical examples are ethylenic unsaturated (meth)acrylamide, an alkyl-substituted (meth)acrylamide, acrylmorpholine, N-vinylpyrrolidone and the like;

(9) a monofunctional monomer or oligomer containing a sulfonic acid group whose typical examples are aliphatic or aromatic vinyl sulfonic acids, and a monofunctional monomer or oligomer containing a sulfonic acid salt, such as an alkaline metal salt, ammonium salt or amine salt of any of the above monofunctional monomers or oligomers containing a sulfonic acid group;

(10) a monofunctional monomer or oligomer containing an OH group, such as 2-hydroxylethyl (meth)acrylate;

(11) a mono functional monomer or oligomer containing an epoxy group, such as glycidyl (meth)acrylate;

(12) a monofunctional monomer or oligomer containing a quaternary ammonium base; and the like.

Among the above-described water-soluble electron-beam-curable resins, a water-soluble electron-beam-curable resin having a primary to tertiary amine group, or a primary to quaternary ammonium salt group is preferred. A water-soluble electron-beam-curable resin having, in the resin structure, an —$NR^1R^2$ group or an —$NH_3Cl$ group is more preferred ($R^1$ and $R^2$ each independently represent a hydrogen atom or $C_nH_{2n+1}$, and n represents an integer of 1 to 4). A mixture of two or more electron-beam-curable resins selected from the above-described resins may be used. A mixture of any of these electron-beam-curable resins and an additional electron-beam-curable resin other than those described above may be used.

The layer containing the electron-beam-curable resin can be applied by using a known coating method. The coating method may be selected from various coating methods including a wire bar coating method, a rod coating method, a roll coating method, an air knife coating method, a blade coating method, a gravure coating method, an extrusion coating method, a curtain coating method and a spray coating method.

With respect to the conditions of the irradiation with electron beams at curing the layer containing the electron-beam-curable resin, an acceleration voltage of 100 kV to 300 kV is preferred. When the acceleration voltage is within such a range, the layer containing the electron-beam-curable resin can be cured efficiently and sufficiently without reduction of the strength of the support or change in color of the support.

The thickness of the layer containing the electron-beam-curable resin is, preferably 1 to 40 μm and, more preferably, 5 to 30 μm.

Embodiment (b)

In this embodiment, the support has two or more layers provided on the image-recording side of the base. The layers include two layers adjacent to each other in which the lower layer contains a thermoplastic resin while the upper layer contains an electron-beam-curable resin. Since the layer containing the electron-beam-curable resin is prepared by pressure-bonding of a film followed by curing, the smoothness of the film is reflected in the finally-obtained surface. In addition, since the layer containing the thermoplastic resin is the lower layer, the smoothness can be further improved. This embodiment is favorable in this regard. The base and the layer containing the electron-beam-curable resin are as described in the above-described Embodiment (a). Hereinafter, the layer containing the thermoplastic resin is described.

[Layer Containing Thermoplastic Resin]

The layer containing the thermoplastic resin is a layer containing a thermoplastic resin which becomes plastic and freely deformable at high temperature.

The thermoplastic resin to be used in the thermoplastic resin layer may be a styrene-butadiene latex, an acrylic latex, or an acrylic silicone latex, and is preferably a polyolefin resin. For example, homopolymers of α-olefins such as polyethylene and polypropylene, mixtures of such various polymers, and random copolymers of ethylene and vinyl alcohol are preferred.

With respect to polyethylene, for example, LDPE (low density polyethylene), HDPE (high density polyethylene), L-LDPE (linear low density polyethylene) each may be used alone or in combination.

In this embodiment, the thickness of the layer containing the thermoplastic resin is preferably 1 to 60 μm and, more preferably, 5 to 50 μm. Further, the thickness of the layer containing the electron-beam-curable resin is preferably 1 to 40 μm and, more preferably, 5 to 30 μm.

Embodiment (c)

In this embodiment, the support has two or more layers on the image-recording side of the base. The layers include two layers adjacent to each other in which the lower layer is a coated layer containing pigment particles and a water-soluble or water-dispersible resin, while the upper layer contains a thermoplastic resin. The base and the upper layer (i.e., the layer containing the thermoplastic resin) are as described in Embodiment (b). Hereinafter, the coated layer is described.

[Coated Layer]

The coated layer is a layer containing pigment particles and a water-soluble or water-dispersible resin. Respective components contained in the coated layer are described below.

-Pigment Particle-

Examples of the pigment particles include titanium oxide, barium sulfate, barium carbonate, calcium carbonate, lithopone, alumina hydrate, zinc oxide, silica antimony trioxide and titanium phosphate. Only a single kind of particles may be used, or a mixture of two or more kinds of particles may be used. Among these compounds, calcium carbonate is particularly preferable in view of cost and whiteness.

The size of the pigment particles is preferably 0.1 to 10 μm. A white pigment with a particle size in the range of 0.1 to 5 μm is preferable since superior smoothness can easily be obtained.

The titanium oxide may be of rutile type or of anatase type. Titanium oxide of one type may be used alone, or a mixture of titanium oxides of the two types may be used in combination. The titanium oxide may be produced by the sulfuric acid method or the chlorine method. The titanium oxide may be selected from titanium oxides which have been subjected to a surface coating treatment with an inorganic material (e.g., a hydrous alumina treatment, a hydrous silicon dioxide treatment, or a zinc oxide treatment), titanium oxides which have been subjected to a surface coating treatment with an organic material (e.g., trimethylol methane, trimethylol ethane, trimethylol propane or 2,4-dihydroxy-2-methyl pentane), and titanium oxides which have been subjected to a siloxane treatment with, for example, polydimethyl siloxane.

The refractive index of the pigment particles is preferably 1.5 or more and, more preferably, 2.0 or more. When a white pigment having the refractive index in the above-described range is contained, a high-quality image can be formed.

The content of the pigment particles in the coated layer varies depending on the type of the pigment particles, the type of the thermoplastic resin, the thickness of the thermoplastic resin, and the like. Usually, the content of the pigment particles based on the mass of the water-soluble or water-dispersible resin to be described below is preferably 5 to 20% by mass and, more preferably, 10 to 20% by mass.

Further, known additives such as antioxidants may be added to the coated layer.

-Water-soluble Resin-

Examples of the water-soluble resin include: polyvinyl-alcohol-based resins, which are resins having hydroxyl groups as hydrophilic structural units, such as polyvinyl alcohol (PVA), acetoacetyl-modified polyvinyl alcohol, cation-modified polyvinyl alcohol, anion-modified polyvinyl alcohol, silanol-modified polyvinyl alcohol and polyvinyl acetal; cellulose-based resins such as methyl cellulose (MC), ethyl cellulose (EC), hydroxyethyl cellulose (HEC), carboxymethyl cellulose (CMC), hydroxypropyl cellulose (HPC), hydroxyethyl methyl cellulose and hydroxypropyl methyl cellulose; chitins; chitosans; starch; resins having ether bonds such as polyethylene oxide (PEO), polypropyrene oxide (PPO), polyethylene glycol (PEG) and polyvinyl ether (PVE); and resins having carbamoyl groups such as polyacrylamide (PAAM), polyvinyl pyrrolidone (PVP) and polyacrylic acid hydrazide. Further, a polyacrylic acid salt having a carboxyl group as a dissociative group, a maleic acid resin, an alginic acid salt, gelatins, and the like are also usable.

In particular, the water-soluble resin is preferably at least one resin selected from the group consisting of polyvinyl-alcohol-based resins, cellulose-based resins, resins having ether bonds, resins having carbamoyl groups, resins having carboxyl groups, and gelatins; polyvinyl alcohol (PVA)-based resins are more preferred.

Examples of such polyvinyl alcohols include those described in Japanese Patent Publication (JP-B) Nos. 4-52786, 5-67432 and 7-29479, Japanese Patent No. 2537827, JP-B No. 7-57553, Japanese Patent Nos. 2502998 and 3053231, JP-A No. 63-176173, Japanese Patent No. 2604367, JP-A Nos. 7-276787, 9-207425, 11-58941, 2000-135858, 2001-205924, 2001-287444, 62-278080 and 9-39373, Japanese Patent No. 2750433, JP-A Nos. 2000-158801, 2001-213045, 2001-328345, 8-324105, 11-348417, 58-181687, 10-259213, 2001-72711, 2002-103805, 2000-63427, 2002-308928, 2001-205919 and 2002-264489.

Further, examples of other water-soluble resins than polyvinyl-alcohol-based resins include the compounds described in paragraphs [0011] to [0012] of JP-A No. 11-165461, and the compounds described in JP-A Nos. 2001-205919 and 2002-264489.

-Water-dispersible Resin-

Examples of the water-dispersible resin include an acrylic latex, a polyester-based latex, an NBR resin, a polyurethane-based latex, a polyvinyl-acetate-based latex, an SBR resin, and a polyamide-based latex. Among these resins, an acrylic latex is preferable in view of the improvement in the whiteness, light resistance and transparency of the obtained image.

The acrylic latex may be, for example, an emulsion obtained by polymerization of acrylic acid, an acrylic acid ester, acrylonitrile, methyl methacrylate or a derivative of any of the above acrylic compounds.

Only one water-soluble resin may be used, or two or more water-soluble resins may be used in combination. Only one water-dispersible resin may be used, or two or more water-dispersible resins may be used in combination. A water-soluble resin and a water-dispersible resin may be used simultaneously.

The total content of water-soluble resin and water-dispersible resin in the coated layer is preferably 1 to 50 $g/m^2$ and, more preferably, 5 to 40 $g/m^2$.

In this embodiment, the thickness of the coated layer is preferably 1 to 55 μm and, more preferably, 5 to 45 μm; and the thickness of the layer containing the thermoplastic resin is preferably 1 to 60 μm and, more preferably, 5 to 50 μm.

Embodiment (d)

The support has two or more layers on the image-recording side of the base. The layers include two layers adjacent to each other in which the lower layer is a cast-coat layer while the upper layer contains a thermoplastic resin. In the present embodiment, the smoothness can be improved by the cast-coat layer and further improved by the layer containing the thermoplastic resin, which also imparts water resistance. This embodiment is preferable in this regard. The base and the layer containing the thermoplastic resin (i.e., the upper layer) are as described in Embodiment (b). Hereinafter, the cast-coat layer is described.

-Cast-coat Layer-

The cast-coat layer is a layer with high smoothness obtained by pressing a coating material coated on the base to a hard mirror-finished face during the time the coating material is plastic, and continuing the pressing until the coating material dries.

Examples of the pigment to be used in the cast-coat layer include calcium carbonate, kaolin, clay, satin white, titanium oxide, aluminum hydroxide, zinc oxide, barium sulfate, calcium sulfate, silica, activated white clay, diatomaceous earth, and lake. The adhesive to be used may be a synthetic adhesives. Examples of the synthetic adhesive include: various copolymers such as a styrene-butadiene copolymer, a styrene-acrylic copolymer, an ethylene-vinyl acetate copolymer, a butadiene-methacrylate copolymer, and a vinyl acetate-butyl acrylate copolymer; a polyvinyl alcohol-maleic acid anhydride copolymer; and an acrylic acid-methyl acrylate copolymer. Further, well-known adhesives such as natural adhesives may be used additionally, as necessary. Examples of natural adhesives include oxidized starches, esterified starches, enzyme-modified starches, cold water-soluble starches obtained by subjecting these starches to fresh-dry, casein, and soybean protein. The amount of the adhesive to be used is, based on 100 parts by mass of the pigment, preferably in the range of 5 go 50 parts by mass and, more preferably, about 10 parts by mass to about 30 parts by mass. Further, various additives with which an ordinary pigment for coat paper is mixed may be used as necessary, such as a dispersant, a thickener, a water-holding agent, a defoamer, and a colorant.

In this embodiment, the thickness of the above-described cast-coat layer is preferably 10 to 50 μm and, more preferably, 15 to 35 μm. The thickness of the layer containing the thermoplastic resin is preferably 1 to 60 μm and, more preferably, 5 to 50 μm.

Embodiment (e)

The support has one or more layers provided on the image-recording side of the base. The outermost layer of the one or more layers contains a thermoplastic resin, and the thickness of the layer containing the thermoplastic resin is 30 μm or more. The present embodiment is favorable in that the center surface average roughness SRa at a cutoff of 0.02 to 0.5 mm can be reduced. The layer containing the thermoplastic resin is as described in Example (b); however, in the present embodiment, the outermost layer is a layer containing the thermoplastic resin, and the thickness of the layer containing the thermoplastic resin is 30 μm or more. In the present embodiment, the thickness of the layer containing the thermoplastic resin is preferably 35 μm or more and, more preferably, 40 μm or more. The maximum thickness of the layer containing the thermoplastic resin is preferably 60 μm.

-Calendering Treatment-

In the invention, after the formation of any one of the layers on the base, a calendering treatment is preferably conducted by using a calender (a soft calender or a super calender or both) in which at least one of the pair of rolls is a metal roll. The surface temperature of the metal roll is preferably not lower than the glass transition temperature of the thermoplastic resin particles and the nip pressure between the rolls is preferably 50 to 400 kg/cm.

In this manner, after any one of the above-described layers is formed on the base, a calendering treatment is conducted under a specific condition, whereby the surface of the image-recording layer disposed thereon surely has high glossiness and high smoothness, and is surely capable of forming a high-quality image and of absorbing the ink solvent in the ink provided on the ink-receiving layer at printing.

In a preferable embodiment, the soft calendering treatment is conducted with a calender (a soft calender or a super calender or both) in which at least one of the pair of the rolls is a metal roll. The other roll is preferably a resin roll. Preferably, the surface temperature of the metal roll is preferably not lower than the glass transition temperature of the thermoplastic resin particles and the nip pressure between the rolls is preferably 50 to 400 kg/cm.

Hereinafter, the soft calender and super calender comprising a metal roll and a resin roll will be described in detail. The metal roll is not particularly limited in its material or the like, as long as the metal roll is a cylindrical or columnar roll having a smooth surface and a heating element provided in the inside of the roll. The metal roll may be appropriately selected from metal rolls known in the art. Since the metal roll comes into contact with the recording side of the support, i.e., the side to be provided with the ink-receiving layer described later at the calendering treatment, the surface roughness of the metal roll is preferably low. More specifically, the surface roughness of the metal roll specified in JIS B0601 is preferably 0.3 s or less, more preferably 0.2 s or less.

In general, the surface temperature of the metal roll during the calendering treatment of the base itself is preferably 70 to 250° C. When the base provided with one or more layers is subjected to the calendering treatment, the surface temperature of the metal roll during the treatment is preferably not lower than the glass transition temperature Tg of the thermoplastic resin particles contained in the layers, more preferably in the range of Tg to Tg+40° C.

The resin roll may be appropriately selected form synthetic resin rolls (e.g., polyurethane resin rolls and polyamide resin rolls). The Shore D hardness of the resin roll is preferably 60 to 90.

The nip pressure between the pair of rolls including the metal roll is preferably 50 to 400 kg/cm, more preferably 100 to 300 kg/cm. The treatment with a soft calender and/or a super calender using the pair of rolls is preferably performed once or twice.

<Image Recording Material>

The image recording material according to the invention has the above-described support of the invention for an image recording material and an image recording layer provided on the support. The center surface average roughness SRa of the face to be provided with the image is 0.1 μm or less when measured under a condition of a cutoff of 0.02 to 0.5 mm, and is 0.4 μm or less when measured under a condition of a cutoff of 1 to 3 mm. The image recording material may have one or more image recording layers that are provided on the undercoat layer of the support directly or via another intervening layer.

The image recording material according to the invention, having a center surface average roughness SRa within the above-described ranges, has excellent smoothness and enables formation of an image with excellent clarity.

When the center surface average roughness SRa measured under a condition of a cutoff of 0.02 to 0.5 mm is more than 0.1 μm, blur of the image is conspicuous. When the center surface average roughness SRa measured under a condition of a cutoff of 1 to 3 mm is more than 0.4 μm, distortion of the image is conspicuous.

The scope of the image recording materials according to the invention include various types of recording media such as an inkjet recording material, an electrophotographic image-receiving material, a silver salt photographic material, a sublimation transfer image-receiving material, a thermally coloring recording material and a thermal transfer image-receiving material.

Hereinafter, the image recording material according to the invention will be described in detail with reference to an inkjet recording medium as an example.

The inkjet recording medium according to the invention has the above-described support of the invention for an image recording material and one or more ink-receiving layers (image recording layers), and may optionally have one or more other layers as necessary.

(Ink-receiving Layer)

The ink-receiving layer preferably comprises a water-soluble resin, a crosslinking agent capable of crosslinking the water-soluble resin, particles, and a mordant. The ink-receiving layer may further comprise other components such as a surfactant as necessary.

Since the ink-receiving layer has a porous structure containing particles, the ink-absorbing property of the ink-receiving layer is improved. In particular, when the proportion of the particles to the total solid of the ink-receiving layer is 50% by mass or higher (preferably 60% by mass or higher), the ink-receiving layer has a more favorable porous structure having a further improved ink-absorbing property. Here, the "proportion of the particles to the total solid of the ink-receiving layer" is a proportion calculated based on the amounts of the components other than water in the ink-receiving layer.

The term "ink-receiving layer having a porous structure" refers to a layer having a void fraction of 50 to 75%, preferably 60 to 70%. When the void fraction is in the range of 50 to 75%, the particles do not fall off since the amount of binder is sufficient. In consideration of the quality of the ink jet recording medium, the thickness of the ink-receiving layer is preferably 20 to 40 μm. Similarly, the 60° glossiness thereof is preferably 30 to 70%.

The void fraction can be measured with a mercury porosimeter (PORESIZER 9320-PC2, manufactured by Shimadzu Corporation).

-Particles-

The particles may be organic particles or inorganic particles. It is preferable to use inorganic particles from the viewpoints of ink-absorbing property and image stability. In the following, particles of respective types are explained.

Preferable examples of the organic particles include polymer particles obtained, for example, by emulsion polymerization, microemulsion polymerization, soap-free polymerization, seed polymerization, dispersion polymerization or suspension polymerization. The polymer particles may be in the state of powder, latex, or emulsion. Examples of the polymer for the polymer particles include polyethylene, polypropylene, polystyrene, polyacrylate, polyamide, silicone resins, phenol resins, and natural polymers.

Examples of the inorganic substance for the inorganic particles include silica, colloidal silica, titanium dioxide, barium sulfate, calcium silicate, zeolite, kaolinite, halloysite, mica, talc, calcium carbonate, magnesium carbonate, calcium sulfate, pseudoboehmite, zinc oxide, zinc hydroxide, alumina, aluminium silicate, calcium silicate, magnesium silicate, zirconium oxide, zirconium hydroxide, cerium oxide, lanthanum oxide, and yttrium oxide.

Among them, inorganic particles are preferable from the viewpoints of ink-absorbing property and image stability. Silica particles, colloidal silica, alumina particles, and pseudoboehmite are preferable since they form better porous structures.

Silica particles are generally classified roughly into wet method particles and dry method (vapor phase method) particles based on the method used for their production. In a typical example of the wet method, activated silica is generated by acid decomposition of a silicate, then the activated silica is allowed to polymerize to a suitable degree to aggregate and precipitate, so that hydrated silica is obtained. Typical examples of the vapor phase method are the flame hydrolysis process of hydrolyzing silicon halide in a vapor-phase at high temperature, and the arc method of heating and vaporizing quartz and coke in an electric furnace by applying an arc discharge to reduce and vaporize silicon followed by the oxidation by the air. The vapor-phase-method silica refers to the anhydrous silica particles produced by the vapor-phase method. Vapor-phase-method silica particles are especially preferable as the silica particles according to the invention.

The vapor-phase-method silica and the hydrated silica are different in the density of silanol group on the surface and the presence of voids therein, and exhibit different properties. The vapor-phase-method silica is suitable for forming a three-dimensional structure higher in void fraction. The reason is supposedly as follows. The hydrated silica particles have a higher density of silanol group on their surfaces which is about 5 to 8 pieces/nm$^2$. Accordingly, the hydrated silica particles are likely to aggregate densely. In contrast, vapor-phase-method silica particles have a lower density of silanol group on their surfaces which is about 2 to 3/nm$^2$. Therefore, vapor-phase-method silica particles gather more loosely (flocculation), so that the resultant structure has a higher void fraction.

Since the vapor-phase-method silica particles have a particularly high specific surface area, the vapor-phase-method silica particles have superior ink absorbing property and retention capacity. In addition, since the vapor-phase-method silica has a lower refractive index, a transparent ink-receiving layer can be obtained when the vapor-phase-method silica particles are dispersed to a suitable particle diameter. Such a transparent ink-receiving layer can realize higher color density and excellent coloration property. The transparency of the ink-receiving layer is important from the viewpoint of obtaining a high color density and excellent color gloss, not only in applications where transparency is required such as OHP sheets, but also in applications for recording sheets such as photographic glossy paper.

The average primary particle diameter of the vapor-phase-method silica particles is preferably 50 nm or smaller, more preferably 20 nm or smaller, particularly preferably 10 nm or smaller, and most preferably 3 to 10 nm. Since the vapor-phase-method silica particles tend to bind to each other via hydrogen bonds between silanol groups, the silica particles forms a structure with a high void fraction and improved ink absorbing property when the average primary particle diameter of the silica particles is 50 nm or smaller.

The silica particles may be used in combination with other particles described above. If such other particles and the vapor-phase-method silica particles are used together, the content of the vapor-phase-method silica particles in all particles is preferably 30% by mass or higher, more preferably 50% by mass or higher.

Alumina particles, alumina hydrate particles, and mixtures or complexes thereof are also preferable as the inorganic particles. Among them, alumina hydrate particles are preferable since it absorbs and holds ink well. In particular, pseudoboemite ($Al_2O_3 \cdot nH_2O$) is preferable. Alumina hydrates in a variety of forms are usable, and it is preferable to use boehmite in the sol state as the raw material since the production of a smooth layer is easier.

The average pore radius of pseudoboemite is preferably 1 to 25 nm, more preferably 2 to 10 nm. The pore volume thereof is preferably 0.3 to 2.0 ml/g (cc/g), more preferably 0.5 to 1.50 ml/g (cc/g). The average pore radius and the pore volume are measured by the nitrogen absorption-desorption method. These values may be measured, for example, with a gas absorption-desorption analyzer (e.g., OMNISORP 369, manufactured by Beckman Coulter, Inc.).

Among alumina particles, gas phase method alumina particles are preferable since they have a greater specific surface area. The average primary particle diameter of the gas phase method alumina particles is preferably 30 nm or smaller, more preferably 20 nm or smaller.

The particles may be used in the manner described in, for example, JP-A Nos. 10-81064, 10-119423, 10-157277, 10-217601, 11-348409, 2001-138621, 2000-43401, 2000-211235, 2000-309157, 2001-96897, 2001-138627, 11-91242, 8-2087, 8-2090, 8-2091, 8-2093, 8-174992, 11-192777, and 2001-301314.

-Water-soluble Resin-

Examples of the water-soluble resin used in the ink-receiving layer include: polyvinyl alcohol resins, which are resins whose structural units have hydroxy groups [polyvinyl alcohol (PVA), acetoacetyl-modified polyvinyl alcohol, cation-modified polyvinyl alcohol, anion-modified polyvinyl alcohol, silanol-modified polyvinyl alcohol, polyvinylacetal, etc.]; cellulose resins [methylcellulose (MC), ethylcellulose (EC), hydroxyethylcellulose (HEC), carboxymethylcellulose (CMC), hydroxypropylcellulose (HPC), hydroxyethylmethylcellulose, hydroxypropylmethylcellulose, etc.]; chitins; chitosans; starch; resins containing ether bonds [polyethylene oxide (PEO), polypropylene oxide (PPO), polyethylene glycol (PEG), polyvinyl ether (PVE), etc.]; and resins containing carbamoyl groups [polyacrylamide (PAAM), polyvinylpyrrolidone (PVP), polyacrylic acid hydrazide, etc.]. Resins having carboxyl groups as dissociative groups are also usable, such as polyacrylate salts, maleic acid resins, alginate salts, and gelatins. Only a single water-soluble resin may be used, or two or more water-soluble resins may be used in combination.

The content of water-soluble resin in the ink-receiving layer is preferably 9 to 40% by mass, more preferably 12 to 33% by mass, with respect to the total mass of the solid in the ink-receiving layer. The water-soluble resin and the particles described above each may comprise a single substance or a composite of plural substances.

From the viewpoint of ensuring the transparency of the ink-receiving layer, the selection of the type of the water-soluble resin used in combination with the particles, especially with silica particles, is important. When the vapor-phase-method silica particles are used, the water-soluble resin to be used is preferably a polyvinyl alcohol resin. The saponification degree of the polyvinyl alcohol resin is preferably 70 to 100%, more preferably 80 to 99.5%.

The polyvinyl alcohol resins contain structural units having hydroxyl groups. Hydrogen bonds between the hydroxyl groups and the surface silanol groups on the silica particles are formed, so that secondary particles of the silica particles work as network chain units to form a three-dimensional network structure. The resultant porous ink-receiving unit has a high void fraction and sufficient strength owing to the formation of this three-dimensional network structure. In inkjet recording, the ink-receiving layer having such a porous structure absorbs ink rapidly through capillary phenomenon, and enables formation of printed dots superior in circularity without ink bleeding.

The polyvinyl alcohol resin may be used together with other water-soluble resins. When other water-soluble resins and the polyvinyl alcohol resin are used in combination, the proportion of polyvinyl alcohol resin to the total water-soluble resin is preferably 50% by mass or higher, more preferably 70% by mass or higher.

<Ratio of Particles to the Water-soluble Resin>

The ratio of the mass (x) of particles to the mass (y) of water-soluble resin (PB ratio: x/y) has a great influence on the structure and strength of the ink-receiving layer. When the mass ratio (PB ratio) is higher, the void fraction, pore volume, and surface area (per unit mass) are larger, but the density and strength tend to be lower.

The PB ratio (x/y) in the ink-receiving layer is preferably 1.5 to 10, so as to prevent the decrease in layer strength and cracking of the layer upon drying caused by an excessively high PB ratio, and so as to prevent the clogging of the voids, which decreases void fraction and ink-absorbing property, caused by an excessively low PB ratio.

When conveyed in paper-conveying systems of ink jet printers, inkjet recording media may experience stress. Accordingly, the ink-receiving layer should have sufficient film strength. Sufficient film strength of the ink-receiving layer is required also for preventing cracking and peeling of the ink-receiving layer upon cutting of the inkjet recording medium into sheets. Considering the above requirements, the PB ratio is preferably 5 or lower. On the other hand, from the viewpoint of ensuring quick ink absorption in ink jet printers, the PB ratio is preferably 2 or higher.

For example, when an aqueous coating liquid containing vapor-phase-method silica particles having an average primary particle diameter of 20 nm or smaller and a water-soluble resin in a PB ratio (x/y) within the range of 2 to 5 homogeneously dispersed therein is applied and dried on a support, a three-dimensional network structure is formed based on the interactions between the secondary particles of the silica particles as the network chains. As a result, a transparent porous film can be formed easily whose average void diameter is 25 nm or smaller, whose void fraction is 50 to 80%, whose void specific volume of 0.5 ml/g or greater, and whose specific surface area is 100 m²/g or larger.

-Crosslinking Agent-

In a preferable embodiment, the ink-receiving layer comprises inorganic particles, a water-soluble resin, and a crosslinking agent capable of crosslinking the water-soluble resin, and the ink-receiving layer is a porous layer cured through the crosslinking reaction between the crosslinking agent and the water-soluble resin.

The crosslinking agent may be selected appropriately considering the type of the water-soluble resin contained in the ink-receiving layer. Boric acid or a boron compound is preferable since they achieve a rapid crosslinking reaction.

Examples of the boron compound include borax, borate salts [e.g., orthoborate salts, $InBO_3$, $ScBO_3$, $YBO_3$, $LaBO_3$, $Mg_3(BO_3)_2$, and $CO_3(BO_3)_2$], diborate salts [e.g., $Mg_2B_2O_5$, and $CO_2B_2O_5$], metaborate salts [e.g., $LiBO_2$, $Ca(BO_2)_2$, $NaBO_2$, and KBO2], tetraborate salts [e.g., $Na_2B_4O_7.10H_2O$], and pentaborate salts [e.g., $KB_5O_8.4H_2O$, $Ca_2B_6O_{11}.7H_2O$, and $CsB_5O_5$].

Among them, borax, boric acid, and borate salts are preferable since they enable rapid crosslinking reactions; boric acid is more preferable. It is particularly preferable to use acrosslinking agent such as described above, in combination with polyvinyl alcohol, which is a water-soluble resin.

The content of crosslinking agent is preferably 0.05 to 0.50 part by mass, more preferably 0.08 to 0.30 part by mass, with respect to 1 part by mass of water-soluble resin. When the content of crosslinking agent is in the above range, the water-soluble resin is crosslinked to efficiently prevent cracking of the resultant layer.

For example, when gelatin is used as the water-soluble resin, compounds other than boron and boron compounds described below are also usable as the crosslinking agent. Examples thereof include: aldehyde compounds such as formaldehyde, glyoxal, and glutaraldehyde; ketone compounds such as diacetyl and cyclopentanedione; active halogen compounds such as bis (2-chloroethyurea)-2-hydroxy-4, 6-dichloro-1,3,5-triazine and 2,4-dichloro-6-S-triazine sodium salt; active vinyl compounds such as divinylsulfonic acid, 1,3-vinylsulfonyl-2-propanol, N,N'-ethylene bis(vinylsulfonylacetamide), and 1,3,5-triacryloyl-hexahydro-S-triazine; N-methylol compounds such as dimethylolurea and methylol dimethylhydantoin; melamine resins (e.g., methylol melamine and alkylated methylol melamines); epoxy resins; isocyanate compounds such as 1,6-hexamethylene diisocyanate; aziridine compounds described in U.S. Pat. Nos. 3,017,280 and 2,983,611; carboxylmide compounds described in U.S. Pat. No. 3,100,704; epoxy compounds such as glycerol triglycidylether; ethylene imino compounds such as 1,6-hexamethylene-N,N'-bisethylene urea; halogenated carboxyaldehyde compounds such as mucochloric acid and mucophenoxychloric acid; dioxane compounds such as 2,3-dihydroxydioxane; metal-containing compounds such as titanium lactate, aluminum sulfate, chrome alum, potassium alum, zirconyl acetate, and chromium acetate; polyamine compounds such as tetraethylene pentamine; hydrazide compounds such as adipic acid dihydrazide; and low-molecular weight compounds or polymers having 2 or more oxazoline groups. Only a single crosslinking agent may be used, or two or more crosslinking agents may be used in combination.

The crosslinking agent may be added to the coating liquid for forming the ink-receiving layer and/or to the coating liquid for forming the layer adjacent to the ink-receiving layer upon application of a coating liquid for forming the ink-receiving layer (hereinafter, referred to as the "coating liquid for the ink-receiving layer"). As alternatives, the ink-receiving layer may be provided with the crosslinking agent by coating a coating liquid for the ink-receiving layer on a support coated with another coating liquid containing the crosslinking agent, or by coating a solution containing the crosslinking agent after the coating and drying of a coating liquid for the ink-receiving layer free of the crosslinking agent.

For example, the crosslinking agent may be added in the following manner. In the following explanation, a boron compound is used as an example of the crosslinking agent. In order to crosslink and cure the coated layer obtained by coating the coating liquid (first solution) for the ink-receiving layer so as to form the ink-receiving layer, a basic solution (second solution) having a pH of 7.1 or higher is coated on the coated layer (1) simultaneously with the coating of the coating liquid to form the coated layer, or (2) during the drying process of the coated layer but before the coated layer exhibits falling dry rate. The boron compound as the crosslinking agent may be contained in the first solution and/or the second solution. Details of the process will be described more specifically later.

-Mordant-

In the invention, the ink-receiving layer preferably includes a mordant in order to further improve the water resistance and resistance to bleeding over time of a formed image. The mordant may be selected from organic mordants such as cationic polymers (cationic mordants) and inorganic mordants such as water-soluble metal compounds. Among them, organic mordants are preferable, and cationic mordants are more preferable.

Water-soluble metal salts as inorganic mordants are preferably tri- or higher-valent metal compounds. Examples thereof include water-soluble salts of metals selected from calcium, barium, manganese, copper, cobalt, nickel, aluminum, iron, zinc, zirconium, chrome, magnesium, tungsten, and molybdenum.

Specific examples thereof include calcium acetate, calcium chloride, calcium formate, calcium sulfate, calcium butyrate, barium acetate, barium sulfate, barium phosphate, barium oxalate, barium naphthoresorcin carbonate, barium butyrate, manganese chloride, manganese acetate, manganese formate dihydrate, manganese ammonium sulfate hexahydrate, cupric chloride, cupric ammonium chloride dihydrate, copper sulfate, copper(II) butyrate, copper oxalate, copper phthalate, copper citrate, copper gluconate, copper naphtenate, cobalt chloride, cobalt thiocyanate, cobalt sulfate, cobalt(II) acetate, cobalt naphthenate, nickel sulfate hexahydrate, nickel chloride hexahydrate, nickel acetate tetrahydrate, nickel ammonium sulfate hexahydrate, nickel amidosulfate tetrahydrate, nickel sulfamate, nickel 2-ethylhexanoate, aluminium sulfate, aluminium sulfinte, aluminum thiosulfate, polychlorinated aluminum, aluminium nitrate nonahydrate, aluminium chloride hexahydrate, aluminum acetate, aluminum lactate, basic aluminum thioglycolate, ferrous bromide, ferrous chloride, ferric chloride, ferrous sulfate, ferric sulfate, iron(III) citrate, iron(III) lactate trihydrate, triammonium iron(III) trioxalate trihydrate, zinc bromide, zinc chloride, zinc nitrate hexahydrate, zinc sulfate, zinc acetate, zinc lactate, zirconyl acetate, zirconyl chloride, oxyzirconyl chloride octahydrate, hydroxyzirconyl chloride, chromium acetate, chromium sulfate, magnesium acetate, magnesium oxalate, magnesium sulfate, magnesium chloride hexahydrate, magnesium citrate nonahydrate, sodium phosphotungstate, sodium tungsten citrate, dodecatungstophosphoric acid n-hydrate, dodecatungsto silicic acid 26-hydrate, molybdenum chloride, and dodecamolybdophosphoric acid n-hydrate. Only a single water-soluble polyvalent metal compound may be used, or two or more water-soluble polyvalent metal compounds may be used in combination. In the invention, the term "water-soluble polyvalent metal compound" refers to a polyvalent metal compound which has a solubility in water of 1% by weight or higher at 20° C.

Among the above-described water-soluble metal compounds, a compound containing aluminum or a metal belonging to group 4A of the periodic table (e.g., zirconium or titanium) is preferred. In particular, a water-soluble aluminum compound is preferred. Examples of the water-soluble aluminum compound include inorganic salts such as aluminum chloride and hydrates thereof, aluminum sulfate and hydrates thereof, and ammonium alum, and basic polyaluminum hydroxide compounds, which are inorganic aluminum-containing cationic polymers.

The above-mentioned basic polyaluminum hydroxide contains a main component represented by the following formula (1), (2) or (3), and is a water-soluble polyaluminum hydroxide stably containing a basic and polymeric polynuclear condensed ion such as $[Al_6(OH)_{15}]^{3+}$, $[Al_8(OH)_{20}]^{4+}$, $[Al_{13}(OH)_{34}]^{5+}$ or $[Al_{21}(OH)_{60}]^{3+}$:

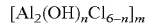
$[Al_2(OH)_nCl_{6-n}]_m$   Formula (1);

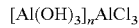
$[Al(OH)_3]_nAlCl_3$   Formula (2);

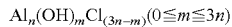
$Al_n(OH)_mCl_{(3n-m)} (0 \leq m \leq 3n)$   Formula (3).

These compounds are commercially available from Taki Chemical K.K. under the name of polyaluminum chloride (PAC: trade name) as a water treatment agent, from Asada Chemical K.K. under the name of polyaluminum hydroxide (PAHO: trade name), from K.K. Riken Green under the name of HAP-25 (trade name), from Taimei Chemicals Co., Ltd under the name of ALFINE 83 (trade name), and also from other manufacturers as similar products. Accordingly, compounds of various grades are easily available.

The water-soluble compound containing a metal belonging to group 4A of the periodic table is preferably a water-soluble compound containing titanium or zirconium. The water-soluble compound containing titanium may be titanium chloride or titanium sulfate. The water-soluble compound containing zirconium may be zirconium acetate, zirconium chloride, zirconium oxychloride, zirconium hydroxychloride, zirconium nitrate, basic zirconium carbonate, zirconium hydroxide, zirconium lactate, ammonium zirconium carbonate, potassium zirconium carbonate, zirconium sulfate, or zirconium fluoride.

(Cationic Mordant)

The cationic mordant is preferably a water-dispersible cationic resin. The water-dispersible cationic resin is preferably a urethane resin that is a cation-modified self-emulsifiable polymer. The water-dispersible cationic resin preferably has a glass transition temperature of less than 50° C.

The term "cation-modified self-emulsifiable polymer" as used herein refers to a polymeric compound capable of naturally forming a stable emulsion in an aqueous dispersing medium in the presence of no or an extremely small amount of emulsifier or surfactant. Quantitatively, the "cation-modified self-emulsifiable polymer" means a polymeric substance capable of forming a stable emulsion at a concentration of 0.5% by mass or more in an aqueous dispersing medium at a room temperature of 25° C. The concentration is preferably 1% by mass or more and, more preferably, 3% by mass or more.

More specifically, the above-described "cation-modified self-emulsifiable polymer" may be a polyaddition-based or polycondensation-based polymeric compound having a cationic group which may be selected, for example from a primary to tertiary amino groups and a quaternary ammonium group.

Vinyl polymerization polymers that are effective as the above-described polymer are, for example, polymers obtained by polymerizing the following vinyl monomers: acrylic acid esters, methacrylic acid esters (the ester group is an alkyl or aryl group which may have a substituent; examples of the ester group include a methyl group, an ethyl group, an n-propyl group, an isopropyl group, an n-butyl group, a sec-butyl group, a tert-butyl group, a hexyl group, a 2-ethylhexyl group, a tert-octyl group, a 2-chloroethyl group, a cyanoethyl group, a 2-acetoxyethyl group, a tetrahydrofurfuryl group, a 5-hydroxypentyl group, a cyclohexyl group, a benzyl group, a hydroxyethyl group, 3-methoxybutyl group, a 2-(2-methoxyethoxy)ethyl group, a 2,2,2-tetrafluoroethyl group, a 1H, 1H, 2H, 2H-perfluorodecyl group, a phenyl group, a 2,4,5-tetramethyl phenyl group, and a 4-chlorophenyl group);

vinyl esters whose examples include vinyl esters of aliphatic carboxylic acids which may have a substituent (e.g., vinyl acetate, vinyl propionate, vinyl butyrate, vinyl isobutyrate, vinyl caproate and vinyl chloroacetate), and vinyl esters of aromatic carboxylic acids which may have a substituent (e.g., vinyl benzoate, vinyl 4-methylbenzoate and vinyl salicylate);

acrylamides whose examples include acrylamide, N-mono-substituted acrylamides and N-di-substituted acrylamides (the substituents each may be an alkyl, aryl, or silyl group which may itself have a substituent, examples of the alkyl, aryl, or silyl group including a methyl group, an n-propyl group, an isopropyl group, an n-butyl group, a tert-butyl group, a tert-octyl group, a cyclohexyl group, a benzyl group, a hydroxymethyl group, an alkoxymethyl group, a phenyl group, a 2,4,5-trimethylphenyl group, a 4-chlorophenyl group and a trimethylsilyl group);

methacrylamides whose examples include methacrylamide, N-mono-substituted methacrylamides and N-di-substituted methacrylamides (the substituent each may be an alkyl, aryl, or silyl group which may itself have a substituent, examples of the alkyl, aryl, or silyl group including a methyl group, an n-propyl group, an isopropyl group, an n-butyl group, a tert-butyl group, a tert-octyl group, a cyclohexyl group, a benzyl group, a hydroxymethyl group, an alkoxymethyl group, a phenyl group, a 2,4,5-tetramethylphenyl group, a 4-chlorophenyl group and a trimethylsilyl group);

olefins (for example, ethylene, propylene, 1-pentene, vinyl chloride, vinylidene chloride, isoprene, chloroprene and butadiene);

styrenes (for example, styrene, methyl styrene, isopropyl styrene, methoxystyrene, acetoxystyrene and chlorostyrene); and vinyl ethers (for example, methyl vinyl ether, butyl vinyl ether, hexyl vinyl ether and methoxyethyl vinyl ether).

Other examples of the vinyl monomer include a crotonic acid ester, an itaconic acid ester, a maleic acid diester, a fumaric acid diester, methyl vinyl ketone, phenyl vinyl ketone, methoxyethyl vinyl ketone, N-vinyloxazolidone, N-vinylpyrrolidone, methylene malonnitrile, diphenyl-2-acryloyloxyethyl phosphate, diphenyl-2-methacryloyloxyethyl phosphate, dibutyl-2-acryloyloxyethyl phosphate and dioctyl-2-methacryloyloxyethyl phosphate.

Examples of the monomer each having a cationic group include monomers having a tertiary amino group such as dialkylaminoethylmethacrylate or dialkylaminoethylacrylate.

The polymer containing a cationic group may be a polyurethane obtained by combining any one of the diol compounds described below and any one of the diisocyanate compounds described below, and then allowing the combination to undergo a polyaddition reaction.

Specific examples of the diols include ethylene glycol, 1,2-propane diol, 1,3-propane diol, 1,2-butane diol, 1,3-butane diol, 2,3-butane diol, 2,2-dimethyl-1,3-propane diol, 1,2-pentane diol, 1,4-pentane diol, 1,5-pentane diol, 2,4-pentane diol, 3,3-dimethyl-1,2-butane diol, 2-ethyl-2-methyl-1,3-propane diol, 1,2-hexane diol, 1,5-hexane diol, 1,6-hexane diol, 2,5-hexane diol, 2-methyl-2,4-pentane diol, 2,2-diethyl-1,3-propane diol, 2,4-dimethyl-2,4-pentane diol, 1,7-heptane diol, 2-methyl-2-propyl-1,3-propane diol, 2,5-dimethyl-2,5- hexane diol, 2-ethyl-1,3-hexane diol, 1,2-octane diol, 1,8-octane diol, 2,2,4-trimethyl-1,3-pentane diol, 1,4-cyclohexane dimethanol, hydroquinone, diethylene glycol, triethylene glycol, dipropylene glycol, tripropylene glycol, polyethylene glycol (average molecular weight=200, 300, 400, 600, 1000, 1500 or 4000), polypropylene glycol (average molecular weight=200, 400 or 1000), polyester polyol, 4,4'-dihydroxydiphenyl-2,2-propane, and 4,4'-dihydroxyphenyl sulfone.

Examples of the diisocyanate compounds include methylene diisocyanate, ethylene diisocyanate, isophorone diisocyanate, hexamethylene diisocyanate, 1,4-cyclohexane diisocyanate, 2,4-toluene diisocyanate, 2,6-toluene diisocyanate, 1,3-xylylene diisocyanate, 1,5-naphthalene diisocyanate, m-phenylene diisocyanate, p-phenylene diisocyanate, 3,3'-dimethyl-4,4'-diphenylmethane diisocyanate, 3,3'-dimethylbiphenylene diisocyanate, 4,4'-biphenylene diisocyanate, dicyclohexylmethane diisocyanate, and methylene bis(4-cyclohexylisocyanate).

The cationic group contained in the cationic-group-containing polyurethane may be, for example, a primary to tertiary amine or a quaternary ammonium salt. In the invention, the self-emulsifiable polymer usable in the aqueous dispersion is preferably a urethane resin having a cationic group which may be selected from a tertiary amine and a quaternary ammonium salt.

The polyurethane containing a cationic group can be obtained by using a diol (which may be selected from the above diols) having a cationic group introduced thereto for the synthesis of the polyurethane. Further, when the cationic group is a quaternary ammonium salt, the polyurethane may be synthesized by quaternizing a polyurethane having a tertiary amino group with a quaternizing agent.

For the synthesis of the polyurethane, only one diol may be used, or two or more diols may be used in an arbitrary ratio for various purposes including the adjustment of glass transition temperature (Tg) of the polymer, improvement of the solubility, providing compatibility with the binder, and the improvement of the stability of the dispersion. Similarly, only one diisocyanate compound may be used, or two or more diisocyanate compounds may be used in an arbitrary ratio for various purposes including the adjustment of glass transition temperature (Tg) of the polymer, improvement of the solubility, providing compatibility with the binder, and the improvement of the stability of the dispersion.

Examples of the cationic mordant include polymer mordants each having a primary to tertiary amino group or a quaternary ammonium salt group as the cationic functional group, and nonpolymeric cationic mordants.

Preferable examples of the polymer mordants include a homopolymer of a monomer (mordant monomer) having a primary to tertiary amino group or a salt thereof or a quaternary ammonium salt group and a copolymer or condensation polymer of the mordant monomer and one or more other monomers (non-mordant polymer). The form of the polymer mordant may be a water-soluble polymer or latex particles dispersible in water.

Examples of the mordant monomer include trimethyl-p-vinylbenzylammonium chloride, trimethyl-m-vinylbenzylammonium chloride, triethyl-p-vinylbenzylammonium chloride, triethyl-m-vinylbenzylammonium chloride, N,N-dimethyl-N-ethyl-N-p-vinylbenzylammonium chloride, N,N-diethyl-N-methyl-N-p-vinylbenzylammonium chloride, N,N-dimethyl-N-n-propyl-N-p-vinylbenzylammonium chloride, N,N-dimethyl-N-n-octyl-N-p-vinylbenzylammonium chloride, N,N-dimethyl-N-benzyl-N-p-vinylbenzylammonium chloride, N,N-diethyl-N-benzyl-N-p-vinylbenzylammonium chloride, N,N-dimethyl-N-(4-methyl)benzyl-N-p-vinylbenzylammonium chloride, N,N-dimethyl-N-phenyl-N-p-vinylbenzylammonium chloride;

trimethyl-p-vinylbenzylammonium bromide, trimethyl-m-vinylbenzylammonium bromide, trimethyl-p-vinylbenzylammonium sulfonate, trimethyl-m-vinylbenzylammonium sulfonate, trimethyl-p-vinylbenzylammonium acetate, trimethyl-m-vinylbenzylammonium acetate, N,N,N-triethyl-N-2-(4-vinyphenyl)ethylammonium chloride, N,N,N-triethyl-N-2-(3-vinyphenyl)ethylammonium chloride, N,N-diethyl-N-methyl-N-2-(4-vinyphenyl)ethylammonium chloride, N,N-diethyl-N-methyl-N-2-(4-vinyphenyl)ethylammonium acetate;

quarternary ammonium compounds prepared by reactions of methyl chloride, ethyl chloride, methyl bromide, ethyl bromide, methyl iodide or ethyl iodide with N,N-dimethylamino ethyl (meth)acrylate, N,N-diethylaminoethyl (meth)acrylate, N,N-dimethylaminopropyl (meth)acrylate, N,N-diethylaminopropyl (meth)acrylate, N,N-dimethylaminoethyl (meth)acrylamide, N,N-diethylaminoethyl (meth)acrylamide, N,N-dimethylaminopropyl (meth)acrylamide, or, N,N-diethylaminopropyl(meth)acrylamide; and sulfonate salts, alkylsulfonate salts, acetates or alkyl carboxylates obtained by exchanging the anion of any of the above quaternary ammonium compounds.

Specific examples of the mordant monomer include monomethydiallylammonium chloride, trimethyl-2-(methacryloyloxy)ethylammonium chloride, triethyl-2-(methacryloyloxy)ethylammonium chloride, trimethyl-2-(acryloyloxy)ethylammonium chloride, triethyl-2-(acryloyloxy)ethylammonium chloride, trimethyl-3-(methacryloyloxy)propylammonium chloride, triethyl-3-(methacryloyloxy)propylammonium chloride, trimethyl-2-(methacryloylamino)ethylammonium chloride, triethyl-2-(methacryloylamino)ethylammonium chloride, trimethyl-2-(acryloylamino)ethylammonium chloride, triethyl-2-(acryloylamino)ethylammonium chloride, trimethyl-3-(methacryloylamino)propylammonium chloride, triethyl-3-(methacryloylamino)propylammonium chloride, trimethyl-3-(acryloylamino)propylammonium chloride, triethyl-3-(acryloylamino)propylammonium chloride;

N,N-dimethyl-N-ethyl-2-(methacryloyloxy)ethylammonium chloride, N,N-diethyl-N-methyl-2-(methacryloyloxy)ethylammonium chloride, N,N-dimethyl-N-ethyl-3-(acryloylamino)propylammonium chloride, trimethyl-2-(methacryloyloxy)ethylammonium bromide, trimethyl-3-(acryloylamino)propylammonium bromide, trimethyl-2-(methacryloyloxy)ethylammonium sulfonate, and trimethyl-3-(acryloylamino)propylammonium acetate.

In addition, monomers such as N-vinylimidazole and N-vinyl-2-methylimidazole are copolymerizable with the mordant monomer.

Polymers having vinyl amine units prepared by polymerization and succeeding hydrolysis of a polymerization unit such as N-vinyl acetamide, N-vinyl formamide, or the like, and salts of such polymers are also usable in the invention.

The non-mordant monomer described above is a monomer that does not contain a basic or cationic group such as a primary to tertiary amino group or a salt thereof, or a quaternary ammonium salt group, and thus shows no or substantially small interaction with the dye in inkjet ink.

Examples of the non-mordant monomers include: (meth)acrylic acid alkyl esters: (meth)acrylic acid cycloalkyl esters such as cyclohexyl (meth)acrylate; (meth)acrylic acid aryl esters such as phenyl (meth)acrylate; aralkyl esters such as benzyl (meth)acrylate; aromatic vinyl compounds such as styrene, vinyltoluene, and α-methylstyrene; vinylesters such as vinyl acetate, vinyl propionate, and vinyl versatate; allyl esters such as allyl acetate; halogen-containing monomers such as vinylidene chloride and vinyl chloride; vinyl cyanides such as (meth)acrylonitrile; and olefins such as ethylene and propylene.

The alkyl portion of the (meth)acrylic acid alkyl ester preferably contains 1 to 18 carbon atoms. Specific examples thereof include methyl (meth)acrylate, ethyl (meth)acrylate, propyl (meth)acrylate, isopropyl (meth)acrylate, n-butyl (meth)acrylate, isobutyl (meth)acrylate, t-butyl (meth)acrylate, hexyl (meth)acrylate, octyl (meth)acrylate, 2-ethylhexyl (meth)acrylate, lauryl (meth)acrylate, and stearyl (meth) acrylate. Among them, methyl acrylate, ethyl acrylate, methyl methacrylate, ethyl methacrylate, and hydroxyethyl methacrylate are preferable. Only a single non-mordant monomer may be used or two or more non-mordant monomers may be used in combination.

Preferable examples of the polymer mordant include polydiallydimethylammonium chloride, polymethacryloyloxyethyl-β-hydroxyethyldimethylammonium chloride, polyethyleneimine, polyamide-polyamine resins, cationized starch, dicyandiamide formalin condensates, dimethyl-2-hydroxypropylammonium salt polymers, polyamidine, polyvinylamine, dicyan-based cationic resins whose typical example is dicyandiamide-formalin polycondensate, polyamine-based cationic resins whose typical example is dicyanamide-diethylenetriamine polycondensate, epichlorohydrin-dimethylamine addition polymerization products, dimethyldiallylammonium chloride-$SO_2$ copolymers, and diallyamine salt-$SO_2$ copolymers.

Specific examples of the polymer mordant include the mordants described in JP-A Nos. 48-28325, 54-74430, 54-124726, 55-22766, 55-142339, 60-23850, 60-23851, 60-23852, 60-23853, 60-57836, 60-60643, 60-118834, 60-122940, 60-122941, 60-122942, 60-235134, and 1-161236; U.S. Pat. Nos. 2,484,430, 2,548,564, 3,148,061, 3,309,690, 4,115,124, 4,124,386, 4,193,800, 4,273,853, 4,282,305, and 4,450,224; JP-A Nos. 1-161236, 10-81064, 10-119423, 10-157277, 10-217601, 11-348409, 2001-138621, 2000-43401, 2000-211235, 2000-309157, 2001-96897, 2001-138627, 11-91242, 8-2087, 8-2090, 8-2091, 8-2093, 8-174992, 11-192777, and 2001-301314.

The inorganic mordant may be a polyvalent water-soluble metal salt or a hydrophobic metal salt compounds other than described above. Examples thereof include salts and complexes of metals selected from magnesium, aluminium, calcium, scandium, titanium, vanadium, manganese, iron, nickel, copper, zinc, gallium, germanium, strontium, yttrium, zirconium, molybdenum, indium, barium, lanthanum, cerium, praseodymium, neodymium, samarium, europium, gadolinium, dysprosium, erbium, ytterbium, hafnium, tungsten, and bismuth.

Specific examples thereof include calcium acetate, calcium chloride, calcium formate, calcium sulfate, barium acetate, barium sulfate, barium phosphate, manganese chloride, manganese acetate, manganese formate dihydrate, manganese ammonium sulfate hexahydrate, cupric chloride, cupric ammonium chloride dihydrate, copper sulfate, cobalt chloride, cobalt thiocyanate, cobalt sulfate, nickel sulfate hexahydrate, nickel chloride hexahydrate, nickel acetate tetrahydrate, nickel ammonium sulfate hexahydrate, nickel amidosulfate tetrahydrate, aluminium sulfate, aluminium alum, basic polyhydroxy aluminum, aluminum sulfate, aluminum thiosulfate, polychlorinated aluminum, aluminium nitrate nonahydrate, aluminium chloride hexahydrate, ferrous bromide, ferrous chloride, ferric chloride, ferrous sulfate, ferric sulfate, zinc phenolsulfonate, zinc bromide, zinc chloride, zinc nitrate hexahydrate, zinc sulfate, titanium tetrachloride, tetraisopropyl titanate, titanium acetylacetonate, titanium lactate, zirconium acetylacetonate, zirconyl acetate, zirconyl sulfate, zirconium ammonium carbonate, zirconyl stearate, zirconyl octylate, zirconyl nitrate, zirconium oxychloride, zirconium hydroxychloride, chromium acetate, chromium sulfate, manganese sulfate, magnesium chloride hexahydrate, magnesium citrate nonahydrate, sodium phosphotungstate, sodium tungsten citrate, dodecatungstophosphoric acid n-hydrate, dodecatungstosilicic acid 26-hydrate, molybdenum chloride, dodecamolybdophosphoric acid n-hydrate, potassium nitrate, manganese acetate, germanium nitrate, strontium nitrate, yttrium acetate, yttrium chloride, yttrium nitrate, indium nitrate, lanthanum nitrate, lanthanum chloride, lanthanum acetate, lanthanum benzoate, cerium chloride, cerium sulfate, cerium octylate, praseodymium nitrate, neodymium nitrate, samarium nitrate, europium nitrate, gadolinium nitrate, dysprosium nitrate, erbium nitrate, ytterbium nitrate, hafnium chloride, and bismuth nitrate. Among them, alumina-containing compounds, titanium-containing compounds, zirconium-containing compounds, and metal compounds (salts or complexes) of the IIIB series of the Periodic Table are preferable.

When such other mordants are added to the ink-receiving layer, the amount of such other mordants is preferably 0.01 to 5 $g/m^2$.

-Other Additives-

The inkjet recording sheet according to the invention may further comprise, as necessary, various additives known in the art such as acids, ultraviolet absorbers, antioxidants, fluorescent whitening agents, monomers, polymerization initiators, polymerization inhibitors, anti-bleeding agents, antiseptics, viscosity stabilization agents, antifoamers, surfactants, antistatic agents, matting agents, anti-curl agents, and water-resistance imparting agents.

When at least the upper part of the ink-receiving layer contains the mordant, the mordant interacts with liquid ink containing an anionic dye as a colorant, thereby stabilizing the colorant to improve the water resistance and to suppress bleeding over time.

The mordant may be contained in the ink-receiving layer coating liquid (first solution) and/or the basic solution (second solution), and is preferably contained in the second solution, which is different from the solution containing inorganic particles (especially, vapor-phase-method silica). This is because the addition of the mordant to the ink-receiving layer coating liquid may result in occurrence of aggregation owing to the presence of the anionic vapor-phase-method silica. However, when the mordant-containing solution and the ink-receiving layer coating liquid are prepared and applied separately, the aggregation of the inorganic particles does not occur, whereby the range of the selection of the mordant is broadened.

The amount of the mordant in the ink-receiving layer is preferably 0.01 to 5 $g/m^2$, more preferably 0.1 to 3 $g/m^2$.

-Other Components-

The inkjet receiving layer according to the invention may further comprise, as necessary, various additives known in the art such as acids, ultraviolet absorbers, antioxidants, fluorescent whitening agents, monomers, polymerization initiators, polymerization inhibitors, anti-bleeding agents, antiseptics, viscosity stabilization agents, antifoamers, surfactants, antistatic agents, matting agents, anti-curl agents, and water-resistance imparting agents.

The ink-receiving layer of the invention may contain an acid. The resistance to yellowing of the white portion of the recording medium can be improved by adjusting the surface pH of the ink-receiving layer to 3 to 8, preferably 3.5 to 6.0, by the addition of the acid. The surface pH may be determined according to "A" method (coating method) of measuring surface PH specified by the Japanese Technical Association of the Pulp and Paper Industry (J.TAPPI). The surface pH can be measured, for example with a pH-measuring set "model MPC" for determining paper surface pH manufactured by KYORITSU CHEMICAL-CHECK Lab., Corp., which complies with "A" method.

Specific examples of the acid include formic acid, acetic acid, glycolic acid, oxalic acid, propionic acid, malonic acid, succinic acid, adipic acid, maleic acid, malic acid, tartric acid, citric acid, benzoic acid, phthalic acid, isophthalic acid, glutaric acid, gluconic acid, lactic acid, aspartic acid, glutamic acid, salicylic acid, salicylic acid metal salts (salt of Zn, Al, Ca, Mg, or the like), methanesulfonic acid, itaconic acid, benzenesulfonic acid, toluenesulfonic acid, trifluoromethanesulfonic acid, styrenesulfonic acid, trifluoroacetic acid, barbituric acid, acrylic acid, methacrylic acid, cinnamic acid, 4-hydroxybenzoic acid, aminobenzoic acid, naphthalenedisulfonic acid, hydroxybenzenesulfonic acid, toluenesulfinic acid, benzenesulfinic acid, sufanilic acid, sulfamic acid, α-resorcinic acid, β-resorcinic acid, γ-resorcinic acid, gallic acid, fluoroglycine, sulfosalicyclic acid, ascorbic acid, erythorbic acid, bisphenolic acid, hydrochloric acid, nitric acid, sulfuric acid, phosphoric acid, polyphosphoric acid, boric acid, and boronic acid. The amount of the acid added may suitably determined such that the surface pH of the ink-receiving layer becomes 3 to 8.

The acid may be used in the form of a metal salt (e.g., a salt of sodium, potassium, calcium, cesium, zinc, copper, iron, aluminium, zirconium, lanthanum, yttrium, magnesium, strontium, cerium, or the like), or in the form of an amine salt (e.g., a salt of ammonia, triethylamine, tributylamine, piperazine, 2-methylpiperazine, polyallylamine, or the like).

The ink-receiving layer according to the invention preferably contains an additive for improving storage stability such as an ultraviolet absorber, an antioxidant, or an anti-bleeding agent.

Examples of the ultraviolet absorber, antioxidant, and antibleeding agent usable in the invention include alkylated phenol compounds (including hindered phenol compounds), alkylthiomethylphenol compounds, hydroquinone compounds, alkylated hydroquinone compounds, tocopherol compounds, thiodiphenylether compounds, compounds having two or more thioether bonds, bisphenol compounds, O-, N- and S-benzyl compounds, hydroxybenzyl compounds, triazine compounds, phosphonate compounds, acylaminophenol compounds, ester compounds, amide compounds, ascorbic acid, amine-based antioxidants, 2-(2-hydroxyphenyl)benzotriazole compounds, 2-hydroxy benzophenone compounds, acrylates, water-soluble or hydrophobic metal salts, organic metal compounds, metal complexes, hindered amine compounds (including TEMPO compounds), 2-(2-hydroxyphenyl)1,3,5-triazine compounds, metal deactivators, phosphite compounds, phosphonite compounds, hydroxylamine compounds, nitrone compounds, peroxide scavengers, polyamide stabilizers, polyether compounds, basic auxiliary stabilizers, nucleating agents, benzofuranone compounds, indolinone compounds, phosphine compounds, polyamine compounds, thiourea compounds, urea compounds, hydrazide compounds, amidine compounds, saccharide compounds, hydroxybenzoic acid compounds, dihydroxybenzoic acid compounds, and trihydroxybenzoic acid compounds.

The ink-receiving layer preferably contains at least one compound selected from the group consisting of alkylated phenol compounds, compounds having two or more thioether bonds, bisphenol compounds, ascorbic acid, amine-based antioxidants, water-soluble or hydrophobic metal salts, organic metal compounds, metal complexes, hindered amine compounds, polyamine compounds, thiourea compounds, hydrazide compounds, hydroxybenzoic acid compounds, dihydroxybenzoic acid compounds, and trihydroxybenzoic acid compounds.

Such other additives may be used alone or in combination of two or more. The additives may be added after 1) solubilized in water, 2) dispersed, 3) dispersed in polymer, 4) emulsified, 5) converted into oil droplets, or 6) encapsulated in microcapsules. The amount of such other additives to be added is preferably 0.01 to 10 g/m$^2$.

The surface of particles may be treated with a silane coupling agent for the purpose of improving the dispersibility of the particles. The silane coupling agent may be selected from silane coupling agents each having a coupling site as well as an organic functional group [e.g., a vinyl group, an amino group (any of primary to tertiary amino groups and a quaternary ammonium salt group), an epoxy group, a mercapto group, a chloro group, an alkyl group, a phenyl group, or an ester group].

In addition, the ink-receiving layer according to the invention (coating liquid for ink-receiving layer) preferably contains a surfactant. The surfactant may be selected suitably from cationic, anionic, nonionic, ampholytic, fluorine-based, and silicone-based surfactants. Only a single surfactant may be used, or two or more surfactants may be used.

Examples of the anionic surfactants include fatty acid salts (e.g., sodium stearate and potassium oleate), alkyl sulfate ester salts (e.g., sodium lauryl sulfate and triethylammonium lauryl sulfate), sulfonate salts (e.g., sodium dodecylbenzenesulfonate), alkyl sulfosuccinate salts (e.g., sodium dioctyl sulfosuccinate), alkyl diphenyletherdisulfonate salts, and alkyl phosphate salts.

The cationic surfactant may be selected, for example from alkylamine salts, quaternary ammonium salts, pyridinium salts, and imidazolium salts.

Examples of the nonionic surfactants include polyoxyalkylene alkylethers and polyoxyalkylene alkylphenyl ethers (e.g., diethylene glycol monoethylether, diethylene glycol diethylether, polyoxyethylene laurylether, polyoxyethylene stearylether, and polyoxyethylene nonylphenylether); oxyethylene oxypropylene block copolymers; sorbitan fatty acid esters (e.g., sorbitan monolaurate, sorbitan monooleate, and sorbitan trioleate); polyoxyethylene sorbitan fatty acid esters (e.g., polyoxyethylene sorbitan monolaurate, polyoxyethylene sorbitan monooleate, and polyoxyethylene sorbitan trioleate); polyoxyethylene sorbitol fatty acid esters (e.g., polyoxyethylene sorbit tetraoleate); glycerin fatty acid esters (e.g., glycerol monooleate); polyoxyethylene glycerin fatty acid esters (polyoxyethylene glycerol monostearate and polyoxyethylene glycerol monooleate); polyoxyethylene fatty acid esters (polyethylene glycol monolaurate and polyethylene glycol monooleate); polyoxyethylene alkylamines; and acetylene glycols (e.g., 2,4,7,9-tetramethyl-5-decyne-4,7-diol, and ethylene oxide and propylene oxide adducts of this diol). Polyoxyalkylene alkylethers are preferable. The nonionic surfactant may be contained in the coating liquid for ink-receiving layer (first solution) and/or the basic solution (second solution). Only one nonionic surfactant may be used or two or more nonionic surfactants may be used.

Examples of the amphoteric surfactants include aminoacid-type, (carboxy ammonium betaine)-type, (sulfone ammonium betaine)-type, (ammonium sulfate ester betaine)-type, and (imidazolium betaine)-type amphoteric surfactants.

For example, the amphoteric surfactants described in U.S. Pat. No. 3,843,368, JP-A Nos. 59-49535, 63-236546, 5-303205, 8-262742, and 10-282619 may be used advantageously. Amino-acid-type amphoteric surfactants are preferable, and examples thereof include the amino-acid-type amphoteric surfactants derived from amino acids (glycine, glutamic acid, histidine, and the like), such as described in JP-A No. 5-303205, which may be N-acylamino acids each having a long chain acyl group and salts thereof. Only one amphoteric surfactant may be used, or two or more amphoteric surfactants may be used in combination.

Examples of the fluorine-based surfactants include compounds prepared via intermediates having perfluoroalkyl groups by electrolytic fluorination, telomerization, oligomerization or the like. Example of such compounds include perfluoroalkyl sulfonate salts, perfluoroalkyl carboxylate salts, perfluoroalkyl ethylene oxide adducts, perfluoroalkyltrialkylammonium salt, perfluoroalkyl-group-containing oligomers, and perfluoroalkyl phosphate esters.

The silicone-based surfactant is preferably selected from silicone oils modified with organic groups. The silicone-based surfactant may have a siloxane structural unit, and 1) the siloxane structural unit may have a side-chain modified with an organic group, or 2) one end of the siloxane structural unit is modified with an organic group, or 3) both ends of the siloxane structural unit are modified with organic groups. The organic group modification may be amino modification, polyether modification, epoxy modification, carboxyl modification, carbinol modification, alkyl modification, aralkyl modification, phenol modification, fluorine modification, or the like.

The content of the surfactant in the ink-receiving layer coating liquid is preferably 0.001 to 2.0% by mass, more preferably 0.01 to 1.0% by mass. When two or more coating liquids are used for the formation of the ink-receiving layer, each of the coating liquids preferably contains the surfactant.

According to the invention, the ink-receiving layer preferably contains a high-boiling point organic solvent so as to prevent curling. The high-boiling point organic solvent is a water-soluble or hydrophobic organic compound having a boiling point of 150° C. or higher under atmospheric pressure. The organic compound may be liquid or solid at room temperature, and may be a low-molecular weight compound or a polymer.

Specific examples thereof include aromatic carboxylate esters (e.g., dibutyl phthalate, diphenyl phthalate, and phenyl benzoate), aliphatic carboxylate esters (e.g., dioctyl adipate, dibutyl sebacate, methyl stearate, dibutyl maleate, dibutyl fumarate, and triethyl acetylcitrate), phosphate esters (e.g., trioctyl phosphate and tricresyl phosphate), epoxy compounds (e.g., epoxidized soy bean oil and epoxidized fatty acid methyl esters), alcohols (e.g., stearyl alcohol, ethylene glycol, propylene glycol, diethylene glycol, triethylene glycol, glycerol, diethylene glycol monobutylether (DEGMBE), triethylene glycol monobutylether, glycerin monomethyether, 1,2,3-butanetriol, 1,2,4-butanetriol, 1,2,4-pentanetriol, 1,2,6-hexanetriol, thiodiglycol, triethanolamine, and polyethylene glycol), vegetable oils (e.g., soy bean oil and sunflower seed oil), and higher aliphatic carboxylic acids (e.g., linoleic acid and oleic acid).

(Preparation of Inkjet Recording Medium)

The ink-receiving layer of the inkjet receiving medium of the invention can be formed preferably by a method (wet-on-wet [WOW] method) which comprises: applying an ink-receiving layer coating liquid (coating liquid A) containing at least vapor-phase-method silica, a water-soluble resin etc. onto the surface of a support; then applying a basic solution of pH 7.1 or higher (solution B) onto the coated layer either (1) simultaneously with the application of the coating liquid A or (2) during the drying of the coated layer formed by the application of the coating liquid A but before the coated layer shows a decreasing rate of drying; and then curing and crosslinking the resulting coated layer. The crosslinking agent for crosslinking the water-soluble resin is contained in at least one of the coating liquid A and the solution B. When the ink-receiving layer is cured and crosslinked as described above, the ink absorbing property can be improved and cracking of the layer can be prevented.

In the WOW method described above, a mordant is preferably added to the solution B since, owing to the addition, the mordant is present mainly near the surface of the ink-receiving layer and sufficiently fixes inkjet recording ink (particularly dye), thus enabling the formation of high-density images and the improvement of the post-printing water-resistance of printed letters and images. A part of the mordant may be contained in the coating liquid A, and in this case, the mordant used in the coating liquid A may be the same as, or different from, the mordant in the solution B. The porous ink-receiving layer obtained in the manner described above can absorb ink rapidly through the capillary phenomenon, whereby dots with excellent circularity can be formed without ink bleed.

For example, the ink-receiving layer coating liquid containing at least vapor-phase-method silica, a water-soluble resin (for example PVA) and a crosslinking agent (for example a boron compound) can be prepared by mixing the vapor-phase-method silica and an aqueous PVA solution (containing PVA, for example, in such an amount as to give the ratio of PVA to vapor-phase-method silica of about 15%) and a boron compound and then subjecting the mixture to a dispersing treatment with a high-speed rotary homomixer (for example, T. K. homomixer (trade name) manufactured by Tokushu Kika Kogyo Co., Ltd.) under a high-speed revolution condition of, for example, 2000 rpm (preferably in the range of 1000 to 5000 rpm), for example for 20 minutes (preferably in the range of 10 to 30 minutes). The resulting coating liquid is in the form of a uniform sol and can be applied and dried on a support by the coating method described later, to form a porous ink-receiving layer.

The particles in the ink-receiving layer coating liquid may be treated with a dispersing machine to form an aqueous dispersion liquid containing particles having a decreased average particle diameter of 10 to 120 nm. As the dispersing machine to be used to give the aqueous dispersion liquid, any of various known dispersing machines such as a disperser may be used. In view of the efficiency of dispersing flocculated particles, medium-stirring dispersing machines, colloid mill dispersing machines, and high-pressure dispersing machines are preferable.

The solvents for the preparation of the respective liquids may be selected from water, organic solvents, and mixed solvents thereof. Examples of organic solvents usable for coating include alcohols such as methanol, ethanol, n-propanol, i-propanol and methoxy propanol, ketones such as acetone and methyl ethyl ketone, tetrahydrofuran, acetonitrile, ethyl acetate, and toluene.

In the invention, the method for coating the coating liquid is not particularly limited, and may be selected from known coating methods. Examples of usable instruments include an extrusion die coater, an air doctor coater, a bread coater, a rod coater, a knife coater, a squeeze coater, a reverse roll coater, and a bar coater.

The basic solution (solution B) having a pH value of 7.1 or higher may be applied after coating of the ink-receiving layer coating liquid (coating liquid A), and this application can be carried out before the coated layer shows a decreasing rate of drying. That is, the ink-receiving layer is preferably produced by coating the coating liquid A and then introducing the solution B during the period in which the coated layer shows a constant rate of drying.

The basic solution (solution B) having a pH value of 7.1 or higher may contain a crosslinking agent and/or a mordant as necessary. The pH value of the basic solution is 7.1 or higher, preferably 7.5 or higher, more preferably 8.0 or higher. When the pH value is lower than 7.1, the crosslinking agent fails to sufficiently promote the crosslinking reaction of the water-soluble polymer contained in the coating liquid A, thus generating failures such as cracking on the ink-receiving layer. The basic solution contains at least a basic substance and/or a salt of a basic substance. Examples of the basic substance include ammonia, a primary amine (ethylamine, polyallylamine etc.), a secondary amine (dimethylamine, triethylamine etc.), a tertiary amine (N-ethyl-N-methylbutylamine etc.), and a hydroxide of an alkali metal or alkaline earth metal.

The basic mordant coating liquid (basic solution B) can be prepared, for example by adding, as mordants (basic compounds), ammonium carbonate (for example, 1 to 10%) and ammonium zirconyl carbonate (for example, 0.5 to 7%) to deionized water and then stirring the mixture sufficiently. The term "%" in each composition refers to % by weight of the solids content.

The expression "before the coated layer exhibits a decreasing rate of drying" usually refers to the period within a few minutes from the application of the ink-receiving layer coating liquid. During the period, the coated layer exhibits a constant rate of drying in which the quantity of the solvent (dispersing medium) contained in the coated layer decreases in proportion to time. For instance, the period during which the coated layer exhibits a "constant rate of drying" is described in Chemical Engineering Handbook (pp. 707-712, Maruzen Co., Ltd., Oct. 25, 1980).

As described above, after coating of the ink-receiving layer coating liquid, the coated layer is dried until the coated layer exhibits a decreasing rate of drying. In general, the coated layer is dried at 40 to 180° C. (preferably, at 50 to 120° C.) for 0.5 to 10 minutes (preferably, for 0.5 to 5 minutes). The above-mentioned drying time is usually suitable though the drying time naturally depends on the coating amount.

Examples of methods for applying the solution B before the coated layer exhibits a decreasing rate of drying include (1) a method of further coating the solution B on the coated layer, (2) a method of spraying the solution B by a spray or the like, and (3) a method of immersing a support having the coated layer formed thereon in the solution B.

In the method (1), for instance, a known coating method using, for example, a curtain flow coater, an extrusion die coater, an air doctor coater, a bread coater, a rod coater, a knife coater, a squeeze coater, a reverse roll coater, or a bar coater may be used as the coating method for coating the solution B. It is preferable to use a method in which a coater does not directly contact with the already-formed coated layer, such as a method using an extrusion die coater, a curtain flow coater or a bar coater.

After the basic solution (solution B) is applied, the coated layer is heated in general to 40 to 180° C. for 0.5 to 30 minutes, whereby the coated layer is dried and hardened. In a preferable embodiment, the coated layer is heated to 40 to 150° C. for 1 to 20 minutes.

In an embodiment, the basic solution (solution B) is applied simultaneously with the application of the ink-receiving layer coating liquid (coating liquid A). In this embodiment, the coating liquid A and the solution B are applied simultaneously on the support (multi-layer coating) such that the coating liquid A is in contact with the support, and then dried and hardened to form the ink-receiving layer.

For instance, the simultaneous coating (multi-layer coating) can be performed by a coating method that uses an extrusion die coater or a curtain flow coater. After the simultaneous coating, the coated layer is dried. In the drying, in general, the coated layer is heated at 15 to 150° C. for 0.5 to 10 minutes, and more preferably at 40 to 100° C. for 0.5 to 5 minutes.

When the simultaneous coating (multi-layer coating) is performed by an extrusion die coater, two kinds of coating liquids to be discharged simultaneously come into contact with each other near the discharge port of the extrusion die coater before the coating liquids are moved onto the support, so that stacked layers are formed. The stacked layers are subjected to multi-layer coating on the support. When the stack of the two layers of the coating liquids is moved onto the support, the crosslinking reaction easily occurs in the interface of the two coating liquids. As a result, the two liquids easily mix with each other near the discharge port of the extrusion die coater to increase the viscosity, whereby there may be difficulty in the coating operation. Therefore, when the coating liquid A and the solution B are coated simultaneously as described above, it is preferable to further provide a barrier layer liquid (an intermediate layer liquid) between the coating liquid A and the solution B to conduct simultaneous coating of the three layers.

The barrier layer liquid can be selected without particular restrictions. The barrier layer liquid may be, for example, water or an aqueous solution containing a small amount of a water-soluble resin. The water-soluble resin is used as a viscosity improver or the like in consideration of coatability. Examples of the water-soluble resin include polymers such as cellulose-based resins (for instance, hydroxypropyl methylcellulose, methyl cellulose, hydroxyethyl methyl cellulose, and the like), polyvinylpyrrolidone, and gelatin. The barrier layer liquid may contain a mordant.

A polymer particle dispersion may be added to one or more layers (for example, the ink-receiving layer) in the inkjet recording medium of the invention. The polymer particle dispersion is used for the purpose of improving physical properties of the film, such as stabilization of the dimensions, prevention of curling, prevention of adhesion and prevention of cracking on the film. The polymer particle dispersion is described in JP-A No. 62-245258, and JP-A No. 62-110066. When a dispersion of polymer particles having a low glass transition temperature (40° C. or less) is added to the ink-receiving layer, the cracking and curling of the layer can be prevented. Alternatively, curling can also be prevented by adding a dispersion of polymer particles having a high glass transition temperature to the back layer.

After the ink-receiving layer is formed on the support, a gloss-imparting layer coating liquid may be applied onto the surface of the ink-receiving layer, to give an inkjet recording medium. The gloss-imparting layer coating liquid contains at least the ultrafine inorganic compound and the water-soluble resin. When the gloss-imparting layer coating liquid is applied, the crosslinking agent may be contained in the gloss-imparting layer coating liquid and/or in the ink-receiving layer coating liquid. Even when the crosslinking agent is contained only in the ink-receiving layer coating liquid, since the ink-receiving layer is formed, and then the gloss-imparting layer coating liquid is applied onto the surface of the ink-receiving layer, the crosslinking agent in the ink-receiving layer enters the gloss-imparting layer through diffusion. Further, when the crosslinking agent is contained in the ink-receiving layer coating liquid, the crosslinking agent is preferably added in the above-described second solution.

When the crosslinking agent is added to the ink-receiving layer coating liquid and the gloss-imparting layer and the ink-receiving layer contain different water-soluble resins, separate crosslinking agents corresponding to the respective water-soluble resins have to be added, for example, to the second solution in some cases; therefore, when the crosslinking agent is added to the ink-receiving layer coating liquid, the gloss-imparting layer and the ink-receiving layer preferably contain the same water-soluble resin.

The solvent to be used in the gloss-imparting layer coating liquid may be appropriately selected from the above-described solvents. Further, the method for forming the gloss-imparting layer is not particularly limited, and may be appropriately selected from the above-described methods.

The gloss-imparting layer can be subjected to a calendering treatment so as to improve the surface smoothness, glossiness, transparency and the coating film strength. The calendering treatment may be conducted by passing the support having the gloss-imparting layer through a roll nip under heat and pressure with, for example, a soft calender, a super calender, a gloss calender or the like.

Usually, the thus-formed gloss-imparting layer is subjected to a heating treatment at 40 to 180° C. for 0.5 to 10 minutes to dry and cure the layer. The heating temperature is preferably 40 to 150° C., and the heating time is preferably 1 to 5 minutes. For example, when the crosslinking agent contained in the first solution is boric acid or a boron compound (such as borax), the heating temperature is preferably 60 to 100° C. and the heating time is preferably 3 to 5 minutes.

The roll temperature at calendering is preferably 30 to 150° C., more preferably 40 to 100° C. The line pressure between the rolls at calendering is preferably 50 to 400 kg/cm, more preferably 100 to 200 kg/cm.

In the case of ink jet recording, the thickness of the ink-receiving layer should be decided in consideration of the void fraction of the layer because the layer should have an enough absorption capacity to absorb all droplets. For example, when the ink quantity is 8 mL/mm$^2$ and the void fraction is 60%, the thickness of the ink-receiving layer is preferably about 15 μm or larger. Considering the above, ink-receiving layer for ink jet recording preferably has a thickness of 10 to 50 μm.

In addition, the median diameter of the voids in the ink-receiving layer is preferably 0.005 to 0.030 μm, more preferably 0.01 to 0.025 m. The void fraction and the void median size may be determined with a mercury porosimeter (trade name: "PORESIZER 9320-PC2", manufactured by Shimadzu Corporation).

The ink-receiving layer is preferably highly transparent. As a rough guide, the haze value of the ink-receiving layer formed on a transparent film support is preferably 30% or less, more preferably 20% or less. The haze value can be determined with a hazemeter (trade name: HGM-2DP, manufactured by Suga Test Instrument Co., Ltd.).

The disclosure of Japanese patent Application No. 2005-29755 is incorporated by reference herein. Further, all publications, patent applications, and technical standards mentioned in this specification are herein incorporated by reference to the same extent as if each individual publication, patent application, or technical standard was specifically and individually indicated to be incorporated by reference. In the present invention, the expression "cut off of X (mm) to Y (mm)" refers to the use of cut-off filters that substantially remove the wavelength regions other than the wavelength region of X (mm) to Y (mm). The measurement of the center surface average roughness can be conducted with a three-dimensional surface profile measuring instrument such as that used in the Examples described below, in the same manner as in the Examples.

EXAMPLES

Hereinafter, the present invention will be described in more detail with reference to examples; however, the invention is not limited thereto. In Examples, inkjet recording media as examples of the image recording medium are prepared. The terms "part" and "%" used in Examples denote "part by mass" and "% by mass", respectively, unless otherwise specified. The terms "average molecular weight" and "polymerization degree" used in Examples denote "weight average molecular weight" and "weight average polymerization degree", respectively.

Example 1

-Preparation of Support A-

1) Preparation of Base Paper (Base)

Wood pulp containing 100 parts of LBKP was beaten by a double disk refiner to a Canadian freeness of 300 ml. 0.5 part of epoxydated behenic acid amide, 1.0 part of anionic polyacrylamide, 0.1 part of polyamide polyamine epichlorohydrin and 0.5 part of cationic polyacrylamide were added to the pulp, the amounts being based on the bone-dry weight ratios. The mixture was weighed by a Fourdrinier paper machine to manufacture base paper of 170 g/m$^2$. Separately, 0.04% of a fluorescent brightener (WHITEX BB: trade name; produced by Sumitomo Chemical Co., Ltd.) was added to an aqueous solution of 4% polyvinyl alcohol. In order to adjust the surface size of the base paper, the base paper was immersed in the aqueous solution so as to impregnate the paper with 0.5 g/m$^2$ of the aqueous solution in terms of the bone-dry weight. The base paper was then dried, and subjected to a calendering treatment, thereby giving a base paper with an adjusted density of 1.05 g/cm$^3$.

2) Formation of Layer Containing Electron-beam-curable Resin

A coating liquid for a layer containing an electron-beam-curable resin having the composition described below was applied onto the front face (the face on which the image recording layer is to be provided) of the base paper with an applicator bar such that the application amount was 15.0 g/m$^2$ to form the layer containing the electron-beam-curable resin. Thereafter, a polyester film (LUMIRROR™ T60: trade mark; available from Toray Industries, Inc.) was adhered to the thus-formed layer by pressure-bonding, and the layer containing the electron-beam-curable resin was irradiated, from the polyester film side, with electron beams emitted by an electron beam irradiation apparatus having an acceleration voltage of 175 kV to give an absorption dose of 3 Mrad, thus curing the layer containing the electron-beam-curable resin. Then, the polyester film was removed. Further, onto the wired face (rear side) not having the layer containing the electron-beam-curable resin, the same coating liquid for the layer containing the electron-beam-curable resin having the composition described below was applied with an applicator bar to give an application amount of 20.0 g/m$^2$, and then irradiated with the electron beam emitted by the electron beam irradiation apparatus having an acceleration voltage of 175 kV to give an absorption dose of 3 Mrad, thus curing the coated material. In this way, the layer containing the electron-beam-curable resin was formed also on the rear side to give a support (1) of Example 1.

[Composition of Coating Liquid for Layer Containing Electron-beam-curable Resin]

Tetraethylene glycol diacrylate (ARONIX M-240: trade name; available from Toagosei Co., Ltd.) 100 parts -Preparation of Inkjet Recording Medium- 1) Preparation of First Coating Liquid Firstly, (1) vapor-phase-method silica particles, (2) ion-exchanged water, (3) SHALLOL™DC-902P and (4) ZA-30 in the composition described below were mixed, and then subjected to dispersing by a high-pressure dispersion method (e.g., dispersing with an ALTIMIZER produced by Sugino Machine Co., Ltd., 130 MPa, 1 pass). Thereafter, the resultant dispersion liquid was heated to 45° C. for 20 hours. Thereafter, (5) boric acid, (6) a polyvinyl alcohol solution, (7) SUPERFLEX 600B, (8) polyoxyethylene lauryl ether and (9) ethanol were added to the resultant dispersion at 30° C., thereby giving a first coating liquid. The mass ratio of silica particles to water-soluble resin (PB ratio=(1):(6)) was 4.5:1. The first coating liquid was acidic (pH 3.9).

content of the coated layer became 20%. During the drying, the coated layer showed constant rate of drying. Thereafter, the support was immersed in a second coating liquid having the composition described below for 3 seconds such that 13 g/m² of the second coating liquid was adhered onto the coated layer, followed by drying at 80° C. for 10 minutes (drying process). In this way, an inkjet recording medium having an ink-receiving layer with a dry film thickness of 32 μm was prepared.

| <Composition of second coating liquid> | |
|---|---|
| (1) Boric acid (crosslinking agent) | 0.65 part |
| (2) Ammonium zirconium carbonate (ZIRCOZOL AC-7 (28% aqueous solution; produced by Daiichi Kigenso Kagaku Kogyo Co., Ltd.) | 2.5 parts |
| (3) Ammonium carbonate (First grade; produced by Kanto Kagaku K.K.) | 3.5 parts |
| (4) Ion-exchanged water | 63.3 parts |
| (5) Polyoxyethylene lauryl ether (surfactant) (EMULGEN 109P: trade name; 2% aqueous solution; HLB value: 13.6; produced by Kao Corp.) | 30.0 parts |

| <Composition of first coating liquid> | |
|---|---|
| (1) Vapor-phase-method silica particles (as inorganic particles, trade name: AEROSIL 300 SF75 available from Nippon Aerosil Co., Ltd.)) | 10.0 parts |
| (2) Ion-exchanged water | 64.8 parts |
| (3) SHALLOL ™ DC-902P (51% aqueous solution) (dispersant; available from Dai-ichi Kogyo Seiyaku Co., Ltd.) | 0.87 part |
| (4) ZA-30 (available from Daiichi Kigenso Kagaku Kogyo Co., Ltd.) | 0.54 part |
| (5) Boric acid (crosslinking agent) | 0.37 part |
| (6) Polyvinyl alcohol (as water-soluble resin) solution [composition of this polyvinyl alcohol solution Kuraray product PVA-235 (saponification degree: 88%; polymerization degree: 3500) | 29.4 parts |
| | 2.03 parts |
| Polyoxyethylene lauryl ether (surfactant) (EMULGEN 109P (10% solution), HLB value: 13.6; produced by Kao Corp.) | 0.03 part |
| Compound 1 described below | 0.06 part |
| Diethylene glycol monobutyl ether (BUTYCENOL 20P, Kyowa Hakko Chemical Co., Ltd.) | 0.68 part |
| Ion-exchanged water | 26.6 parts] |
| (7) SUPERFLEX 650 (produced by Dai-ichi Kogyo Seiyaku Co., Ltd.) | 1.24 parts |
| (8) Polyoxyethylene lauryl ether (surfactant) (EMULGEN 109P (10% solution), HLB value: 13.6; produced by Kao Corp.) | 0.49 part |
| (9) Ethanol | 2.49 parts |

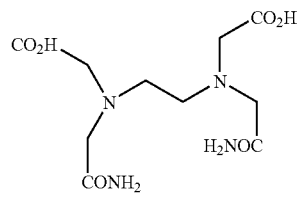

Compound 1

2) Formation of Ink-receiving Layer

After a corona discharge treatment was performed on the surface of the support (1), a 5-fold diluted aqueous solution of polyaluminum chloride (ALFINE 83: trade name; available from Taimei Chemicals Co., Ltd) as the first coating liquid was coated on the support at a rate of 10.8 ml/m² by an inline coating method to give a coating amount of 173 ml/m² (coating process). The coated layer was dried at 80° C. with a hot-wind drier (wind velocity: 3 to 8 m/sec) until the solid Example 2

After the wire face (rear side) of the base paper prepared in Example 1 was subjected to corona discharge treatment, high-density polyethylene was coated thereon with a melt extruder to form a resin layer having a thickness of 19 μm whose surface was matte (hereinafter, the resin layer face is referred to as rear face). The resin layer on the rear side was further subjected to corona discharge treatment. Then an aqueous dispersion liquid containing aluminum oxide (ALUMINA SOL 100: trade name; produced by Nissan Chemical Industries, Ltd.) and silicon dioxide (SNOWTEX O: trade name; produced by Nissan Chemical Industries, Ltd.) in a ratio of 1:2 by mass was coated thereon as an antistatic agent, to give a dry coating amount of 0.2 g/m².

Further, after the felt face (front side) not having the resin layer was subjected to corona discharge treatment, a low-density polyethylene having an MFR (melt flow rate) of 3.8 and containing 10% of anatase-type titanium dioxide, a slight amount of ultramarine, and 0.01% (based on the amount of polyethylene) of a fluorescent brightener was extruded in a thickness of 29 μm with a melt-extruder, thereby forming a highly glossy thermoplastic resin layer on the front side of the base paper (hereinafter, this glossy face is referred to as "front face").

Further, the coating liquid for a layer containing an electron-beam-curable resin used in Example 1 was coated on the front face with an applicator bar to give a coating amount of 15.0 g/m², thereby forming a layer containing an electron-beam-curable resin. Then, a polyester film (LUMIRROR™T60: trade mark; available from Toray Industries, Inc.) was adhered thereto by pressure-bonding. Thereafter, the layer containing the electron-beam-curable resin was irradiated, from the polyester film side, with electron beams emitted by an electron beam irradiation apparatus having an acceleration voltage of 175 kV to give an absorption dose of 3 Mrad, thereby curing the layer containing the electron-beam-curable resin. Then, the polyester film was removed to give a support (2) of Example 2.

-Preparation of Inkjet Recording Medium-

By using the support (2), an inkjet recording medium of Example 2 was prepared in the same manner as in Example 1.

Example 3

A coating liquid (C) having the composition described below was coated on the felt face (front face) of the base paper prepared in Example 1 with a wire bar coater and dried to give a coated layer with a dry coating amount of 10.0 g/m². On this coated sheet having the coated layer provided thereon, super calender treatment was performed twice (temperature: 80° C.; line pressure: 200 kg/cm).

Next, high-density polyethylene was coated with a melt extruder on the face of the base paper not having the coated layer to a thickness of 19 μm, thereby forming a resin layer having a matte face (hereinafter, the resin layer face is referred to as rear face). This resin layer on the rear side was further subjected to corona discharge treatment. Then, an aqueous dispersion liquid containing aluminum oxide (ALUMINA SOL 100: trade name; produced by Nissan Chemical Industries, Ltd.) and silicon dioxide (SNOWTEX 0: trade name; produced by Nissan Chemical Industries, Ltd.) in a ratio of 1:2 by mass was coated thereon as an antistatic agent, giving a dry coating amount of 0.2 g/m².

Further, after the face of the base paper having the coated layer was subjected to corona discharge treatment, a low-density polyethylene having a MFR (melt flow rate) of 3.8 and containing 10% of anatase-type titanium dioxide, a slight amount of ultramarine, and 0.01% (based on the amount of polyethylene) of a fluorescent brightener was extruded thereon in a thickness of 29 μm with a melt-extruder, thereby forming a highly glossy thermoplastic resin layer on the front side of the base paper (hereinafter, this glossy face is referred to also as "front face"). A support (3) of Example 3 was prepared in this way.

| <Composition of coating liquid (C)> | |
|---|---|
| Solution A | 71.0 parts |
| Borax (10% aqueous solution) | 14.0 parts |
| SBR latex (water-dispersant resin) (trade name: SN-307; produced by Sumitomo Chemical ABS Latex Co., Ltd.; 48% aqueous solution) | 12.0 parts |
| Ion-exchanged water | 3.0 parts |

Solution A was prepared by subjecting a mixture of the following compounds for 10 minutes with a dissolver:

| | |
|---|---|
| Clay (trade name: UW-90; produced by Engelhardt) | 60.0 parts; |
| Calcium carbonate (trade name: BRILLIANT 15; produced by Shiraishi Kogyo Kaisha, Ltd.) | 40.0 parts; and |
| Sodium polyacrylate | 0.4 part |

-Preparation Of Inkjet Recording Medium-

Using the support (3), an inkjet recording medium of Example 3 was prepared in the same manner as in Example 1.

Example 4

An inkjet recording medium of Example 4 was prepared in the same manner as in Example 1 except that the following pseudoboehmite was used in place of the vapor-phase-method silica particles used in Example 1:

| | |
|---|---|
| Pseudoboehmite (trade name: ALUMINA SOL-520; produced by Nissan Chemical Industries, Ltd.) | 10.0 parts |

Example 5

An inkjet recording medium of Example 5 was prepared in the same manner as in Example 2 except that the pseudoboehmite used in Example 4 was used in place of the vapor-phase-method silica particles used in Example 2.

Example 6

An inkjet recording medium of Example 6 was prepared in the same manner as in Example 3 except that the pseudoboehmite used in Example 4 was used in place of the vapor-phase-method silica particles used in Example 3.

Example 7

After the cast-coat layer of a cast coat paper (trade mane: ESPRIT COAT C; produced by Nippon Paper Industries Co., Ltd.) was subjected to corona discharge treatment, a low-density polyethylene having a MFR (melt flow rate) of 3.8 and containing 10% of anatase-type titanium dioxide, a slight amount of ultramarine, and 0.01% (based on the amount of polyethylene) of a fluorescent brightener was extruded in a thickness of 29 μm with a melt-extruder to form a highly glossy thermoplastic resin layer on the front side of the base paper (hereinafter, this glossy face is referred to as "front face") A support (7) of Example 7 was prepared in this way.

-Preparation of Inkjet Recording Medium-

Using the support (7), an inkjet recording medium of Example 7 was prepared in the same manner as in Example 1.

Example 8

-Preparation of Support-

After the wire face (rear side) of the base paper prepared in Example 1 was subjected to corona discharge treatment, high-density polyethylene was coated thereon with a melt-extruder to form a resin layer having a thickness of 38 μm whose surface was matte (hereinafter, the resin layer face is referred to as rear face). The resin layer on the rear side was further subjected to corona discharge treatment. Then, an aqueous dispersion liquid containing aluminum oxide (ALUMINA SOL 100: trade name; produced by Nissan Chemical Industries, Ltd.) and silicon dioxide (SNOWTEX O: trade name; produced by Nissan Chemical Industries, Ltd.) in a ratio of 1:2 by mass was coated thereon as an antistatic agent, giving a dry coating amount of 0.2 g/m².

Further, after the felt face (front side) not having the resin layer was subjected to corona discharge treatment, a low-density polyethylene having a MFR (melt flow rate) of 3.8 and containing 10% of anatase-type titanium dioxide, a slight amount of ultramarine, and 0.01% (based on the amount of polyethylene) of a fluorescent brightener was extruded in a thickness of 40 μm with a melt-extruder, thereby forming a highly glossy thermoplastic resin layer on the front side of the base paper. A support (8) of Example 8 was prepared in this way.

-Preparation of Inkjet Recording Medium-

Using the support (8), the inkjet recording medium of Example 8 was prepared in the same manner as in Example 1.

Comparative Example 1

An inkjet recording medium of Comparative Example 1 was prepared in the same manner as in Example 2 except that the electron-beam-curable resin layer was not provided.

Comparative Example 2

An inkjet recording medium of Comparative Example 2 was prepared in the same manner as in Example 1 except that the following wet-process silica particles were used in place of the vapor-phase-method silica particles used in Example 1: Wet-process silica particles (trade name: FINESIL X-37B; produced by Tokuyama Corp.) 10.0 pats Evaluation The supports and inkjet recording media of Examples and Comparative Examples were subjected to evaluation tests as described below. The test results are shown in Table 1.

(1) Center Surface Average Roughness (SRa Value)

The center surface average roughness (SRa value) was measured under the condition of a cutoff of 0.02 to 0.5 mm with a three dimensional surface configuration analysis microscope ZYGO NEWVIEW 5000 (produced by Zygo Co.). The measurement and analysis conditions were as follows.

<Measurement and analysis conditions>

| Measurement length: | 10 mm in X direction and 10 mm in Y direction |
| objective lens: | 2.5-power |
| Band pass filter: | 0.02 to 0.5 mm |

The center surface average roughness (SRa value) was measured under the condition of a cutoff of 1 to 3 mm with a surface configuration measurement apparatus NANOMETRO 110F (produced by Kuroda Precision Industries Ltd.). The measurement and analysis conditions were as follows.

<Measurement and analysis conditions>

| Scanning direction: | CD direction of sample |
| Measurement length: | 50 mm in X direction and 30 mm in Y direction |
| Measurement pitch: | 0.1 mm in X direction and 1.0 mm in Y direction |
| Scanning speed: | 20 mm/sec |
| Band pass filter: | 1 to 3 mm |

(2) Image Clarity

The image clarity was measured and evaluated with an image clarity measuring instrument ICM-1 (produced by Suga Test Instrument Co. Ltd.) by the image clarity testing method defined by JIS H8686-2 (1999) under the measurement conditions and analysis conditions described below. The test sample was a solid black (K) image that was printed on each inkjet recording medium with an inkjet printer (PM-G800; manufactured by Seiko Epson Corp.).

<Measurement conditions>

| Measurement method: | Reflection |
| Measurement angle: | 60° |
| Optical comb: | 2.0 mm |

[Evaluation criteria]

| AA: | image clarity was 90% or more; |
| BB: | image clarity was 70% or more but less than 90%; |
| CC: | image clarity was 30% or more but less than 70%; |
| DD: | image clarity was less than 30%. |

(3) Ink Absorbing Property

Using an inkjet printer (PM-G800; manufactured by Seiko Epson Corp.), solid images of Y (yellow), M (magenta), C (cyan), K (black), B (blue), G (green), and R (red) were printed on the inkjet recording media of Examples and Comparative Examples. Thereafter (about 10 seconds after printing), paper was pressed against the images and the degree of transfer of ink to the paper was evaluated according to the following criteria:

| [Criteria] |
| --- |
| AA: Almost no transfer of ink to the paper was observed (ink absorption is favorable). |
| BB: Partial transfer of ink to the paper was observed (but practically acceptable). |
| CC: Heavy transfer of ink to the paper was observed. |

TABLE 1

| | | | Ex. 1 | Ex. 2 | Ex. 3 | Ex. 4 | Ex. 5 | Ex. 6 | Ex. 7 | Ex. 8 | Comp. Ex. 1 | Comp. Ex. 2 |
| --- | --- | --- | --- | --- | --- | --- | --- | --- | --- | --- | --- | --- |
| Support | Center surface average roughness (SRa, μm) | 0.1 to 0.5 mm | 0.095 | 0.080 | 0.122 | 0.095 | 0.080 | 0.122 | 0.081 | 0.080 | 0.168 | 0.095 |
| | | 1 to 3 mm | 0.225 | 0.180 | 0.433 | 0.225 | 0.180 | 0.433 | 0.322 | 0.290 | 0.483 | 0.225 |
| Inkjet recording medium | Center surface average roughness (SRa, μm) | 0.1 to 0.5 mm | 0.062 | 0.049 | 0.086 | 0.065 | 0.052 | 0.088 | 0.051 | 0.060 | 0.122 | 0.135 |
| | | 1 to 3 mm | 0.203 | 0.132 | 0.355 | 0.220 | 0.152 | 0.355 | 0.277 | 0.210 | 0.433 | 0.211 |
| | Image clarity | — | 90.2 | 95.0 | 80.0 | 90.0 | 92.0 | 82.4 | 93.4 | 91.2 | 75.0 | 67.7 |
| | | — | AA | AA | BB | AA | AA | BB | AA | AA | BB | CC |
| | Ink absorbing property | — | AA | AA | AA | BB | BB | BB | AA | AA | AA | CC |

As shown in Table 1, supports (1) to (8) of Examples 1 to 8 having center surface average roughness SRa values within the range according to the invention were highly smooth. Further, the inkjet recording media of Examples 1 to 8 prepared by using those supports (1) to (8) had center surface average roughness SRa values within the range according to the invention and had high image clarity favorable ink absorbing property. On the other hand, Comparative Examples 1 and 2 whose center surface average roughness SRa values were out of the range of the invention were inferior in image clarity.

The invention claimed is:

1. A support for an image recording material for receiving at least an image recording layer, wherein a center surface average roughness SRa of a support surface to be provided with the image recording layer is 0.15 μm or less when measured under a condition of a cutoff of 0.02 to 0.5 mm, and is 0.45 μm or less when measured under a condition of a cutoff of 1 to 3 mm; and
   wherein the support comprises a base and one or more layers provided on an image recording side of the base, and at least one of the one or more layers comprises an electron-beam-curable resin.

2. The support according to claim 1, wherein the one or more layers further comprises a layer comprising a thermoplastic resin that is adjacent to the layer comprising an electron-beam-curable resin.

3. The support according to claim 1, wherein the support comprises a base and one or more layers on an image recording side of the base, an outermost layer of the one or more layers comprises a thermoplastic resin, and the thickness of the layer containing the thermoplastic resin is 30 μm or more.

4. An image recording material comprising the support of claim 1 and an image forming layer provided on the support, wherein a center surface average roughness SRa of a surface of the image recording material, which surface is to be provided with an image, is 0.1 μm or less when measured under a condition of a cutoff of 0.02 to 0.5 mm, and is 0.4 μm or less when measured under a condition of a cutoff of 1 to 3 mm.

5. The image recording material according to claim 4, wherein the image recording material is selected from the group consisting of an inkjet recording material, an electrophotographic image-receiving material, a silver salt photographic material, a sublimation transfer image-receiving material, a thermally coloring recording material, and a thermal transfer image-receiving material.

6. The image recording material according to claim 5, wherein the image forming layer is an ink-receiving layer.

7. The image recording material according to claim 6, wherein the ink-receiving layer comprises inorganic particles.

8. The image recording material according to claim 7, wherein the inorganic particles are selected from the group consisting of silica particles, colloidal silica, alumina particles, and pseudoboehmite.

9. The image recording material according to claim 7, wherein the inorganic particles are selected from the group consisting of vapor-phase-method silica and pseudoboehmite.

10. A support for an image recording material for receiving at least an image recording layer, wherein a center surface average roughness SRa of a support surface to be provided with the image recording layer is 0.15 μm or less when measured under a condition of a cutoff of 0.02 to 0.5 mm, and is 0.45 μm or less when measured under a condition of a cutoff of 1 to 3 mm, wherein the support comprises a base and two or more layers provided on an image recording side of the base, and the layers include two layers adjacent to each other in which a lower layer is a coated layer comprising pigment particles and a water-soluble or water-dispersible resin and an upper layer comprises a thermoplastic resin.

11. A support for an image recording material for receiving at least an image recording layer, wherein a center surface average roughness SRa of a support surface to be provided with the image recording layer is 0.15 μm or less when measured under a condition of a cutoff of 0.02 to 0.5 mm, and is 0.45 μm or less when measured under a condition of a cutoff of 1 to 3 mm, wherein the support comprises a base and two or more layers provided on an image recording side of the base, and the layers include two layers adjacent to each other in which a lower layer is a cast-coat layer and an upper layer comprises a thermoplastic resin.

* * * * *